(12) United States Patent
Hoskins et al.

(10) Patent No.: US 10,030,818 B2
(45) Date of Patent: Jul. 24, 2018

(54) DEVICE, METHOD AND SYSTEM FOR MONITORING A NETWORK OF FLUID-CARRYING CONDUITS

(71) Applicant: IMPERIAL INNOVATIONS LIMITED, London (GB)

(72) Inventors: Asher John Hoskins, West Sussex (GB); Ivan Iordanov Stoianov, London (GB)

(73) Assignee: IMPERIAL INNOVATIONS LIMITED (GB)

(*) Notice: Subject to any disclaimer, the term of this patent is extended or adjusted under 35 U.S.C. 154(b) by 432 days.

(21) Appl. No.: 14/648,439

(22) PCT Filed: Nov. 28, 2013

(86) PCT No.: PCT/GB2013/053144
§ 371 (c)(1),
(2) Date: May 29, 2015

(87) PCT Pub. No.: WO2014/083340
PCT Pub. Date: Jun. 5, 2014

(65) Prior Publication Data
US 2015/0308627 A1    Oct. 29, 2015

(30) Foreign Application Priority Data

Nov. 30, 2012 (GB) .................... 1221644.6

(51) Int. Cl.
*F17D 5/06*     (2006.01)
*G01F 1/00*    (2006.01)
*F17D 5/02*    (2006.01)
*E03B 7/00*    (2006.01)
*G01D 4/00*    (2006.01)

(52) U.S. Cl.
CPC .................. *F17D 5/06* (2013.01); *E03B 7/00* (2013.01); *F17D 5/02* (2013.01); *G01F 1/00* (2013.01);
(Continued)

(58) Field of Classification Search
CPC ..................................... F17D 5/06; F17D 5/02
See application file for complete search history.

(56) References Cited

U.S. PATENT DOCUMENTS

| 4,353,118 A | 10/1982 | Heimgartner et al. |
| 6,491,062 B1 * | 12/2002 | Croft ........................ F17D 5/06 |
| | | 137/624.11 |

(Continued)

FOREIGN PATENT DOCUMENTS

| CN | 105492874 A * | 4/2016 | ............... E03B 7/00 |
| EP | 2926094 A1 * | 10/2015 | ............... E03B 7/00 |

(Continued)

OTHER PUBLICATIONS

International Search Report and Written Opinion, PCT/GB2013/053144, 10 pages, dated Apr. 16, 2014.
(Continued)

*Primary Examiner* — Douglas Menz
(74) *Attorney, Agent, or Firm* — Dorsey & Whitney LLP

(57) ABSTRACT

A liquid-flow monitoring device (10) arranged to monitor the flow of liquid in a conduit. The device (10) comprises sampling means (20), processing means (30) and data storage means (40). The sampling means is arranged to receive data substantially continuously from a sensor (12) indicative of at least one variable sensed by the sensor (12) indicative of fluid flow in a conduit and to sample the data to produce a stream of sampled data. The processing means (30) is arranged to process the stream of sampled data to extract at least one sub-sampled stream therefrom, the sub-sampled stream comprising a plurality of data sets, each data set being a statistical subset of the stream of sampled data over a respective data-set period. The data storage means (40) is arranged to store the at least one sub-sampled stream.

31 Claims, 19 Drawing Sheets

(52) U.S. Cl.
CPC ............ *G01D 4/004* (2013.01); *Y02B 90/242* (2013.01); *Y04S 20/322* (2013.01)

(56) References Cited

U.S. PATENT DOCUMENTS

| | | | |
|---|---|---|---|
| 6,654,697 | B1 | 11/2003 | Eryurek et al. |
| 7,219,553 | B1* | 5/2007 | Worthington ............. F17D 5/02 73/753 |
| 7,357,034 | B1 | 4/2008 | Worthington |
| 2001/0054967 | A1 | 12/2001 | Vanderah et al. |
| 2002/0029130 | A1 | 3/2002 | Eryurek et al. |
| 2004/0212369 | A1 | 10/2004 | Hammel et al. |
| 2004/0249583 | A1 | 12/2004 | Eryurek et al. |
| 2007/0284293 | A1 | 12/2007 | Pitchford et al. |
| 2012/0101745 | A1 | 4/2012 | Kohno et al. |
| 2015/0308627 | A1* | 10/2015 | Hoskins .................... E03B 7/00 702/45 |

FOREIGN PATENT DOCUMENTS

| | | | | |
|---|---|---|---|---|
| JP | 2002188936 | A | | 7/2002 |
| JP | 2005207965 | A | | 8/2005 |
| KR | 20150095718 | A | * 8/2015 | ............... E03B 7/00 |
| WO | WO2001/018496 | A3 | | 3/2001 |
| WO | WO2001/023972 | A1 | | 4/2001 |
| WO | WO2004/010234 | A2 | | 1/2004 |
| WO | WO2007/021419 | A1 | | 2/2007 |
| WO | WO2010/114408 | A1 | | 10/2010 |
| WO | WO 2014083340 | A1 | * 6/2014 | ............... E03B 7/00 |

OTHER PUBLICATIONS

Great Britain Search Report, GB1221644.6, 4 pages, dated Mar. 18, 2013.

Moving average, Wikipedia page, Nov. 28, 2012, http://en.wikipedia.org/w/index.pho?title=Moving_average&oldId=5254.

* cited by examiner

Table 1

| Raw Data | | Time (secs) | One minute subsample | | |
|---|---|---|---|---|---|
| Time (seconds) | Data | | Minimum | Mean | Maximum |
| 0 | 10 | 0 | 10 | 12.25 | 14 |
| 15 | 12 | | | | |
| 30 | 14 | | | | |
| 45 | 13 | | | | |
| 60 | 9 | 60 | 5 | 7.75 | 10 |
| 75 | 5 | | | | |
| 90 | 10 | | | | |
| 105 | 7 | | | | |
| 120 | 8 | 120 | 8 | 11 | 15 |
| 135 | 12 | | | | |
| 150 | 15 | | | | |
| 165 | 9 | | | | |

FIG. 19

DEVICE, METHOD AND SYSTEM FOR MONITORING A NETWORK OF FLUID-CARRYING CONDUITS

FIELD

This invention relates to a device and system for, and a method of, monitoring fluid flow in a conduit. In embodiments, it relates to monitoring water flow in a water supply system.

BACKGROUND

It is sometimes assumed that water supply systems operate in steady-state hydraulic conditions. In reality, these hydraulic conditions are frequently quasi-steady and unsteady due to the stochastic nature of demand, operations of valves, pumps, malfunctioning surge protection devices and occasional bursts. The current drive for managing leakage by reducing and controlling the operational pressure in near real-time might further exacerbate the problem as it introduces hydraulic instabilities. In addition, pump optimisation which includes frequently switching pumps off and on for energy reduction results in sudden changes in hydraulic conditions. This causes an increase in pipe stress and leads to associated fatigue failures. These sudden and gradual hydraulic variations lead to an increased level of bursts and significant cost in terms of fixing pipe failures and civil litigation claims from those suffering related financial loss.

Therefore, it is highly desirable that the ageing pipeline infrastructure is kept under steady state hydraulic conditions to extend service life. This requires that dynamic hydraulic conditions are continuously monitored and analyzed, such that failures or other undesirable events can be promptly identified and repaired or in some other way addressed.

Current industry practice for monitoring hydraulic conditions in water supply networks makes use of monitoring devices that sample at a frequency of one sample every fifteen minutes (referred to in this disclosure as 15 min sampling). These monitoring devices are powered down between sampling periods to minimise the power consumption and extend the battery life. Consequently data acquired using these devices provide only periodic snapshots of the hydraulic conditions which do not capture the dynamic hydraulic behaviour and/or transient and surge events.

Devices that are capable of high-frequency sampling for monitoring pressure transients, such as pressure surges, already exist. Examples are those devices disclosed in U.S. Pat. Nos. 7,219,553 and 7,357,034. These devices capture pre-defined transient events as the sampling rate is increased when an event is detected and the device stores these events in an internal memory. A surge, which is an example of a transient event, is determined by the rate of change (using a gradient detector) and a maximum threshold. The interpretation of the transient events is done by a human operator and it requires the use of specialised engineering skills.

The main drawbacks of the system described in U.S. Pat. Nos. 7,219,553 and 7,357,034 and other surge monitoring devices are:
(i) Only extreme surge events are captured as the acquisition is triggered by absolute values and gradient thresholds. In reality, dynamic hydraulic conditions are stochastic and characterized by a wide range of frequencies and amplitudes. These are omitted by existing devices.
(ii) The assembly of post-factum surge data from multiple locations is significantly hindered as the transients might have dissipated below the established trigger thresholds and not captured. This significantly limits the quality and availability of the captured data for analyzing the surge events and diagnosing failures; and
(iii) The system is mainly deployed in over ground installations as it requires the use of large energy sources (e.g. large solar panels) and of line of sight (GPS) for time synchronization.

Research by the present inventors in the area of hydraulic transients demonstrates that these events have different characteristics, frequency of occurrence, amplitude, shape, rate of change and energy dissipation. Many of these events do not constitute sudden and extreme transients which cause immediate pipe failures. The dynamic hydraulic conditions frequently include low amplitude high-frequency pressure oscillations for which trigger values such as gradient detectors and threshold are not appropriate. Lowering the trigger values would result in continuous sampling with the acquisition of several orders of magnitude more data which existing surge (i.e. transient) logging equipment cannot manage.

The described dynamic hydraulic conditions will not immediately compromise the integrity of a pipeline. Experimental research by the present inventors has demonstrated that such events cause fatigue failures and accelerate fatigue-induced corrosion. Both of these mechanisms contribute to pipe deterioration and burst frequency. Furthermore, the rapid changes in fluid velocity increase the shear stress along the pipe wall which results in the resuspension of sediments and scouring of biofilms. As a result, the dynamic hydraulic conditions also affect the water quality, decrease the residual chlorine and result in discoloration and customers' complaints. These examples illustrate that the definition and characterization of a transient event such as a surge event requires significantly more sophisticated processing and data management routines than the ones described in U.S. Pat. Nos. 7,219,553 and 7,357,034.

SUMMARY

[Stratified Storage; Subsampling; Statistical Subsets]

According to a first aspect of this invention, there is provided a liquid-flow monitoring device arranged to monitor the flow of liquid in a conduit, the device comprising sampling means, processing means and data storage means, wherein:

the sampling means is arranged to receive data substantially continuously from a sensor indicative of at least one variable sensed by the sensor indicative of fluid flow in a conduit and to sample the data to produce a stream of sampled data;

the processing means is arranged to process the stream of sampled data to extract at least one sub-sampled stream therefrom, the sub-sampled stream comprising a plurality of data sets, each data set being a statistical subset of the stream of sampled data over a respective data-set period;

the data storage means is arranged to store the at least one sub-sampled stream.

According to a second aspect of this invention, there is provided a method of monitoring the flow of liquid in a conduit, the method comprising the steps of a liquid-flow monitoring device:

receiving data substantially continuously from a sensor, the data indicative of fluid flow in a conduit, and operating sampling means of the device to sample the data to produce a stream of sampled data;

processing the stream of sampled data using processing means of the device to extract information therefrom;

transmitting periodically the extracted information to a central location by operating communication means of the device;

storing, using data storage means of the device, a more complete representation of the stream of sampled data for a least one time period than is provided by the extracted information;

receiving at the communication means a request from the or another central location for a more complete representation of the stream of sampled data during the time period and, in response thereto, transmitting to the or another central location the more complete representation.

[Addresses Drawbacks of Existing Devices]

In existing devices, it is not possible to retrospectively "go back" and extract high-frequency time-synchronized data for arbitrary time intervals or data between the periodic data snapshots in order to obtain more information about an event of interest; data for these periods are not acquired and are lost. For example, if a burst or another failure occurs, operators cannot query the dynamic (unsteady-state) hydraulic conditions prior to the burst, or upsample the historic data (increase the temporal resolution), and query multiple devices for the same time interval to identify the failure causes and mechanisms. By providing at least one stream of sub-sampled data—that is, by providing stratified storage, of statistical subsets of the data—relevant information over the time period of interest can be readily obtained either locally by coupling the device to an interrogating device, or remotely over a communications link.

[Periodic Reporting]

The device may comprise communication means. The processing means may be further arranged to process the stream of sampled data to extract summary information therefrom. The communications means may be arranged periodically to transmit the summary information to a central location remote from the device. The at least one sub-sampled stream may comprise a more complete representation of the stream of sampled data over a particular period than is provided by the extracted summary information over that period.

[The Sensed Variable]

The variable that is sensed may be fluid pressure and/or fluid velocity and/or height of flow in the conduit. The variable that is sensed may be indicative of water quality, for example of chlorine concentration or water turbidity. The device may comprise the sensor.

The statistical subset comprised in each data set of the subsampled stream may comprise the maximum and/or minimum and/or mean and/or standard deviation and/or another statistical value of the data over the respective period of the data set.

[Retrospective Interrogation]

The device may be further arranged, upon the communication means receiving from the or another central location a request for a more complete representation of the stream of sampled data at or over a specified time, to transmit to the or the other central location one or more of the data sets corresponding to the specified time. The request for a more complete representation may be a request for at least a portion of the at least one sub-sampled stream. The communication means may transmit the or each data set contained in that portion.

There may be a plurality of subsampled streams, each comprising a plurality of data sets that comprise a statistical and/or decimated subset of the stream of sampled data, the data sets of each subsampled stream comprising a statistical subset over periods of different respective length. In other words, each subsampled stream may be subsampled at a different frequency. The frequencies may differ by an order of magnitude.

Where there are a plurality of subsampled streams, the request for a more complete representation may be a request for a respective portion from each of a plurality of the subsampled streams. The communication means may, in response to this request, transmit the or each data set in each of these portions.

The duration of the or each subsampled stream that is stored may be a predetermined duration. This may be the same for each subsampled stream. The or each subsampled stream may be stored in a circular buffer. The device may also store an uninterrupted stream of the stream of sampled data of corresponding duration. This may also be stored in a circular buffer. The duration may be of the order of days or weeks or months.

[Sampling]

The sampling by the sampling means may be at high-frequency. For example, it may be between 64 and 1024 samples per second (S/s). 256 S/s is one example. The sampling rate may be either of these two rates; it may be any rate in-between. In other embodiments, another sampling rather may be used. Where the variable that is sensed is fluid pressure, the sampling rate may be between 100 and 300 S/s, and may be 200 S/s. Where the variable that is sensed is fluid velocity, the sampling rate may be between 0.5 and 2 S/s, and may be 1 S/s. Water quality variables (chlorine and turbidity) are sampled at 15 mins but a faster sampling rate is triggered (5 mins) if a transient is detected. Pressure can be used as a primary variable to trigger an increased sampling rate for the secondary variables. The sampling rate of the sampling means may be controlled by the processing means. The sampling rate may be so controlled in response to receiving a signal at the communication means from the or another central location to change the sampling rate. The sampling means may stamp each data point with a time stamp corresponding to the time at which the data point was sensed.

The sampling means may receive the data from the sensor substantially in real time. The stream of sampled data may be produced by the sampling means substantially in real time.

[Identifying Transients]

Processing the stream of sampled data to extract summary information therefrom may comprise identifying transient events and/or identifying non-transient events. The identification of a transient and/or non-transient event may form at least part of the extracted summary information. The processing may comprise processing portions of the stream of sampled data, each portion corresponding to a respective time period. The portion may be a portion that corresponds to a rolling time period. In other words, the processing may be over a rolling window on to the stream of sampled data. The time periods may be selected so as to be long enough such that each portion contains a complete set of sampled data for the longest transient event that would be experienced by a system of which the conduit and/or device forms part. For each portion, the sampled data may be analyzed to determine whether or not the portion contains data indicative of a transient event. This may be done by summing the difference between successive data points over the time period to give a cumulative sum. The sum may be compared against a probability of that sum being indicative of a transient event to determine whether or not a transient event has been identified. This may be done by comparing the sum against a record of the probability of that sum being indicative of a transient. The record may be a probability distribution function of probability of the sum occurring against the value of the sum. The record may be generated during operation of the device by recording each sum and its frequency of occurrence. The record may be updated continuously during operation as each cumulative sum is calculated. The record may comprise an indication of a threshold indicative of the probability value below which it is determined that the sum is indicative of a transient event and hence that a transient event has been identified. The probability of the calculated cumulative sum occurring may be compared against that threshold. The transient detection algorithm therefore allows for the autonomous self-tuning of individual devices and this process is site specific—different water supply systems will experience different levels of dynamic hydraulic behaviour (background behaviour).

In response to identifying a transient event, the communication means may transmit a signal indicative of this to the central location. This may occur without waiting for the next periodic transmission of extracted summary information. It may happen upon identifying the transient event. The signal may comprise data from the portion in which the transient event has been identified.

[Summary Statistical Information]

Processing the stream of data to extract the summary information therefrom may comprise determining summary statistical information from the stream of sampled data, the summary statistical information forming at least part of the extracted summary information. The summary statistical information may comprise one or more maximum and/or minimum and/or mean and/or variance and/or standard deviation value of the portion of the stream. The summary statistical information may comprise one or more maximum and/or minimum and/or mean and/or variance and/or standard deviation value of a time period, termed a "summary time period", which may correspond to plural ones of the portions. For example, the summary time period may be one or more hours, days or weeks. In embodiments, the notion of continuously monitoring the dynamic hydraulic behaviour will also have an impact on the communication intervals. The system can tolerate longer periods between communication (e.g. once per hour vs a current trend of 30 mins) if the hydraulics of the pipe network has little variation and it is steady-state.

The period of transmission by the communication means of the extracted information may substantially be the same as the summary time period.

[PDFs and Impact Metrics]

In response to identifying a transient event, the processing means may also generate a transient descriptor that indicates one or more characteristics of the identified transient event. An example of a transient descriptor is the gradient of the transient, that is the rate of change of the sensed variable with time over the time of the transient or some other time such as the duration of the respective portion in which the transient is identified. Other transient descriptors include the direction of the gradient, the start and/or stop magnitudes of the transient, the dissipation gradient, a sequence of gradient changes. The or each transient descriptor is used by the processing means to generate an indication of the severity of the transient. This may be done by comparing the value of the transient descriptor against an indication of the probability of that value of the transient descriptor occurring. This may be done in substantially the same way as the way in which transients are identified. For example, the value of the transient descriptor may be compared with a probability distribution of measured values of the transient descriptor during use to ascertain the probability of that value. The ascertained probability may be compared with one or more thresholds to give the severity of the transient. Thus, the arrangement can provide for autonomous self-tuning and site-specific thresholds. Thresholds may be used to classify the transient in terms of its severity. There may be three classes. These may correspond to transients being of low concern, of medium concern, of high concern. These measures of severity may be termed "impact metrics". The impact metrics may combine results from the summary statistical information. The impact metrics may form part of the extracted summary information that is periodically sent to the central location.

The impact metric may determine the frequency of transmission of the extracted summary information from the communication means. In response to the impact metric rising above a defined threshold, the extracted summary information may be transmitted more frequently. In response to the impact metric falling below the or another defined threshold, the extracted summary information may be transmitted less frequently. An impact metric indicative of a transient of high concern may initiate substantially immediate transmission to the central location of the extracted information.

[Plural Channels]

The device may have plural channels of sensed data. The device may receive respective data substantially continuously from each of a plurality of sensors indicative of a respective variable sensed by each sensor. The sampling means may sample the data to produce a respective stream of sampled data for each of the variables sensed. The device may be arranged such that, and the method may be such that, each stream is handled in parallel in substantially the same way.

[Clock Drift]

According to another aspect, there is provided a monitoring device arranged to receive high frequency data from a sensor and to associate data points of that data each with a respective time-stamp, the device comprising a clock module and receiving means, the clock module comprising a local clock arranged to keep time and further comprising signal receiving means arranged periodically to receive a wireless time signal from a remote source indicative of the precise time, the clock module arranged to compare the time kept by the local clock with the time signal and to adjust the local clock and thereby improve the accuracy of its time keeping.

The clock module may be arranged repeatedly, and optionally periodically, to compare the time kept by the local clock with the time signal and to adjust the local clock. The clock module may variably adjust the local clock by speeding up and/or slowing down the clock at different times over a time period. The clock module may learn how the local clock tends to vary with reference to the precise time over a time period and compensate for this variance by adjusting the clock to achieve substantially precise time keeping. The clock module may also receive a signal indicative of the local temperature and vary the local clock at least partly based on this. The device may operate the receiving means more frequently initially to receive the time signal in order to learn how the local clock tends to vary and then operate the receiving means less frequently when the variance of the local clock has been learned.

The device of this aspect may additionally be the device of the first aspect, having the same features and optional features. Similarly, features of this aspect may also be features of any other aspect.

[Modular]

The device of any aspect may be modular. Components of the device may be housed in respective housings that can be locally, and optionally releasably, coupled together for operation. The processing means may be housed in a main module; the storage means and optionally the communication means, if any, may be housed in a memory module; the sensor and optionally the sampling means may be housed in a sensor module. A power source, such as a battery, may be housed in a power module. The memory module may comprise a display in the housing thereof indicative of the operation of the device and the acquired data. The display may be indicative of whether or not a transient event has been determined in a previous period; it may be indicative of the severity of any determined transient event. The display may indicate the impact stress metric. The memory module may be arranged for local communication with interrogation apparatus, such as a portable computer. This may be wired or wireless communication. The memory module may be arranged to operate as a micro-server server during such communication. The or each pressurized module may comprise an air pressure sensor arranged to provide data to the processing means. Upon detecting a drop in air pressure below a specified threshold, the processing means may identify that the module in question should be examined and generate a signal indicative of this. This signal may be communicated to the central location. The processor may also shut down in response to this.

The battery module may comprise an ID chip to uniquely identify the battery, the ID chip being readable by the processing means when the battery module is connected for operation.

[Central Processing]

According to a third aspect of this invention, there is provided a central control station for identifying the approximate location of the causes of transient events in a network of conduits through which fluid flows, the central control station comprising processing means and communication means, wherein:

the communication means are arranged to receive, from a plurality of remote devices, respective extracted information indicative of a transient fluid-flow event in a respective length of conduit with which the remote device is associated, the extracted information comprising a substantially precise time stamp associated with the transient event; and the processing means are arranged to determine based on the extracted information, and knowledge of the geographical position of each device, the approximate location of the cause of the transient event.

The remote devices of this third aspect may each be one of the devices of the first aspect.

The central control and processing means may comprise at least one computer processor, associated computer-readable non-volatile storage, and associated visual display means.

According to a fourth aspect of this invention, there is provided a liquid-flow monitoring system for monitoring the flow of liquid in a plurality of conduits making up a network, the system comprising a plurality of the devices as defined in the first aspect and central control and processing means as defined in the third aspect.

[General]

For all aspects above, except where an optional feature recited above makes reference to another optional feature which is needed in order for the first feature to work, each of the optional features recited above may be provided in an embodiment in isolation from the other optional features. It is also envisaged that optional features may be included together in embodiments in any workable combination. If is further envisaged that optional features of each aspect are also optional features of each other aspect.

It is envisaged that, in preferred embodiments, the conduit is a water supply conduit of a water supply system, such as a water supply system supplying water to domestic and/or industrial users of water. In other embodiments, the conduit may be a conduit in a waste water system, an oil or gas pipeline, a conduit in a process plant or a nuclear plant. Other applications are also possible and envisaged. In particular, it is envisaged that the device, method and system may be used to sense parameters affecting structures such as bridges, roads, buildings and other structures, instead of a variable indicative of fluid flow in a conduit. In these applications, one more or all of the following may be sensed: force, frequency and/or amplitude of vibration, sound amplitude and/or frequency, displacement. This list is non-exhaustive.

At least certain features of example embodiments provide for the following:

(i) Monitor continuously and retroactively query and extract high-frequency data from multiple embedded logging/telemetry devices to characterize the dynamic hydraulic conditions and facilitate the post-mortem analysis of failures and diagnosis of surge protection devices. This eliminates the complex setting of variable speed logging as described in U.S. Pat. Nos. 7,219,553 and 7,357,034 which frequently omits critical events, does not capture critical data and cannot provide historic high frequency data for arbitrary periods selected by the user.

(ii) Detect in near real-time deviations from the designed steady state hydraulic conditions within complex water supply systems. Correlating information extracted from quasi steady state and transient data with pipe physical and topological information is used for the calculation of a transient index (a system stress level) to facilitate the prompt recognition of suboptimal operation and trigger maintenance. This will also include the detection of hydraulic instabilities due to malfunctioning or wrongly setup control valves. Keeping the water distribution systems under steady state hydraulic conditions will significantly extend the infrastructure lifecycle, reduce the annual cost in fixing bursts, and reduce the number of discoloration events.

(iii) Diagnose the operation and deviations from the design specifications of surge protection devices: the data are used for detecting, locating and scheduling the maintenance of malfunctioning control and air valves and failed surge protection equipment. It can also be used as a safety assurance and insurance that surge protection devices are operating according to their design specifications. Compare the response of a water supply system to a range of hydraulic transients.

(iv) Ensure and monitor the safe implementation of pump optimization schemes.

(v) Monitor water transmission mains for leaks by continuously acquiring high frequency pressure signals and detecting gradient changes under different pressure variations.

(vi) Use the apparatus as a distributed database for storing raw high frequency data, statistical measures of the pressure variations over a set of predefined intervals (e.g. 1 s, 1 minute, 15 minutes) and signatures of transient events. This setup is essential for performing continuous high speed time-synchronized data with very low power consumption.

(vii) Reducing the risk of water quality contamination due to sub-atmospheric pressure generated by hydraulic transients.
(viii) Control the risk for a sudden change (reduction) in the chlorine residual.
(ix) Reducing the variability in the hydraulic conditions will improve the accuracy of near real-time hydraulic simulation models.
(x) Energy efficient data management for continuous sampling/monitoring and optimized data storage.

BRIEF DESCRIPTION OF THE DRAWINGS

Specific embodiments of the invention will now be described by way of example only and with reference to the accompanying drawings, in which:

FIG. 19 is a table showing an example of data stored in the remote device of FIG. 2.

SPECIFIC DESCRIPTION OF CERTAIN EXAMPLE EMBODIMENTS

Water transmission and distribution systems are critical infrastructure with an increasing level of control and consequences of failures. The continuous monitoring of the loading conditions resulting from the dynamic hydraulic behaviour facilitates maintaining the structural strength of ageing pipeline infrastructure and protecting the water quality. Monitoring and controlling the dynamic hydraulic conditions requires a novel method and apparatus for continuous high-frequency time synchronized data collection and for the management of large volumes of data under severe power constraints. The monitoring system should also allow queries on near real-time and retrospective queries extracting time-synchronized high-frequency hydraulic data for arbitrary periods of time. This is particularly useful when bursts and other failures have occurred and a root cause analysis is required to identify the failure mechanisms by extracting high frequency time synchronized data prior to and during the system failure.

Figure 1:
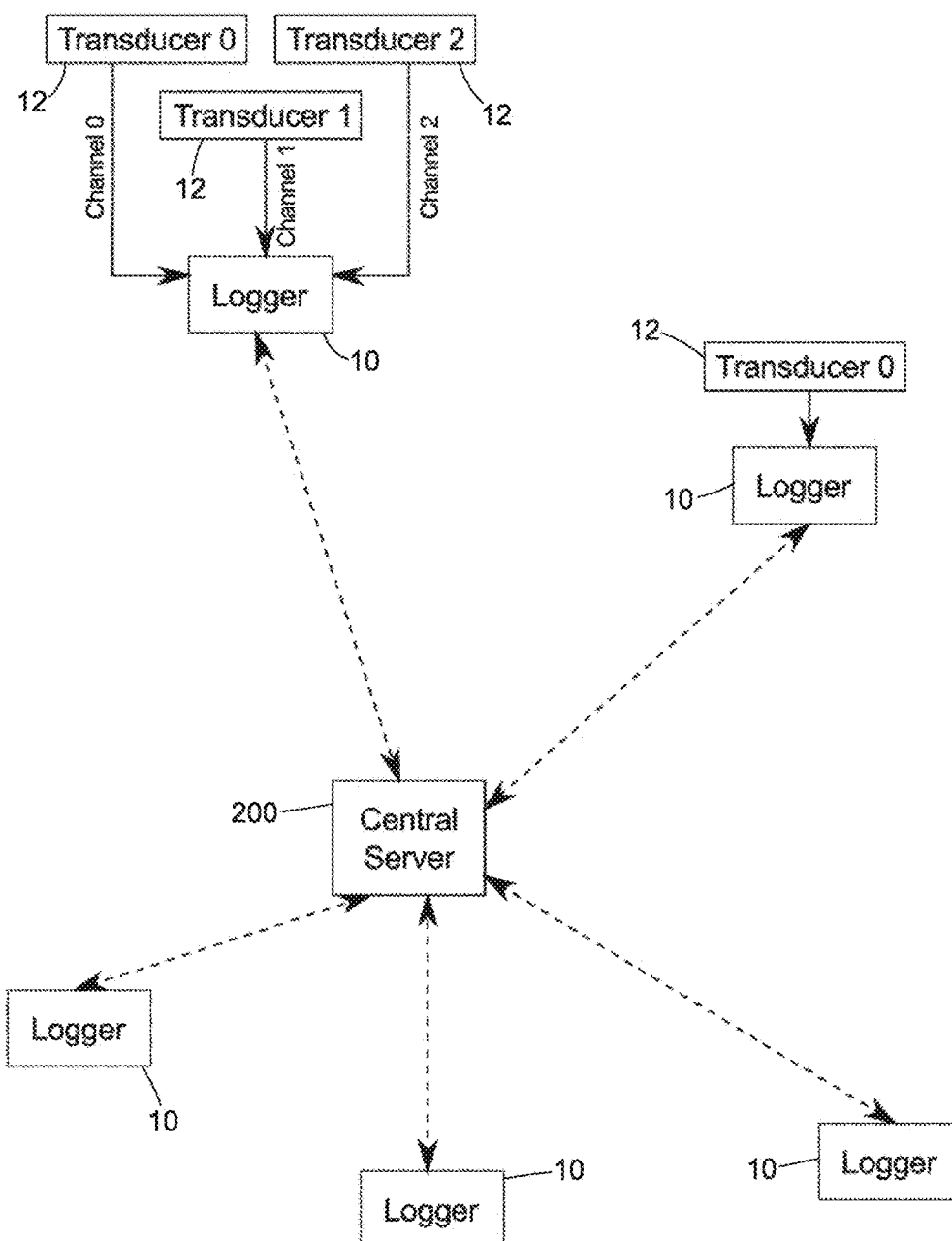
FIG. 1 is an overview in schematic form of a liquid-flow monitoring system comprising a central control station and five remote devices.

An overview of a system 100 embodying the invention is shown in FIG. 1. As can be seen, the system 100 is made up of a several remote devices 10 arranged to communicate with a central control station in the form of a server 200. In this embodiment, the communication is wireless communication as will be explained below. Each remote device 10 is a liquid-flow monitoring device arranged to monitor liquid flow in a conduit. Each device 10 is made up of several hardware components, each one carrying out several functions.

Figure 2:
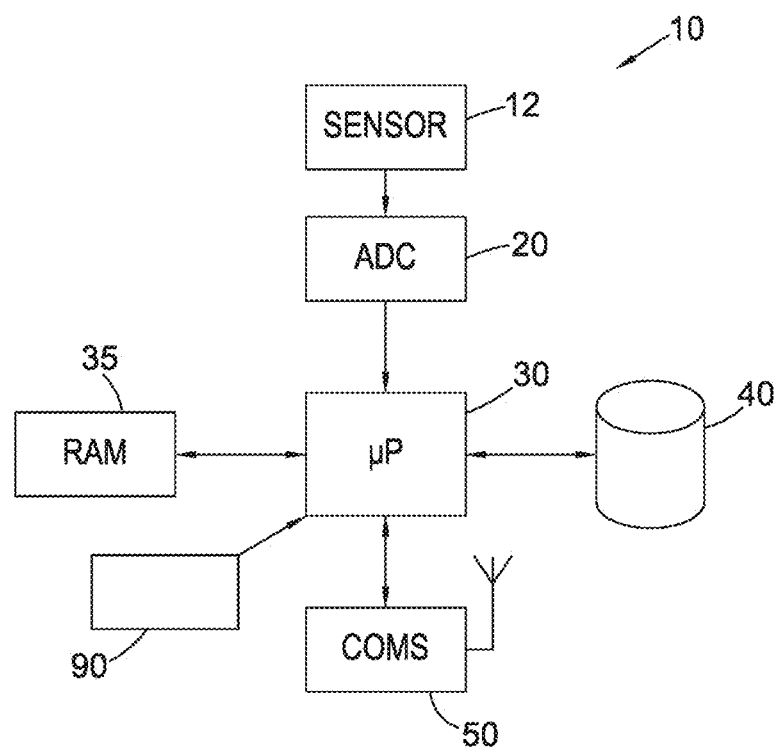
FIG. 2 is a schematic diagram of the hardware arrangement of a representative one of the remote devices.

FIG. 2 shows in more detail, but in schematic form, the principal hardware components that make up a representative one of the devices 10.

The device includes sensing means in the form of a sensor 12. In this embodiment, the sensor 12 is arranged in a conduit of a water supply network, although it is envisaged that, in other embodiments, the sensor may be positioned for other applications. The sensor 12 is arranged to sense a variable indicative of the water flow in the conduit. This may include, for example, the pressure, velocity, height, or temperature of the flow, or any other characteristic. In this example, the variable that is sensed is pressure. The sensor 12 provides the data indicative of the sensed pressure as a continuous signal in real time.

The device 10 also includes sampling means 20 in the form of an analogue-to-digital converter (ADC) 20 that receives data from the sensing means 12 indicative of the sensed pressure. The ADC 20 is arranged to sample the data 25 at high-frequency. In this embodiment, the data indicative of water pressure is sampled at a rate of 200 S/s. The ADC time-stamps each data point to output a stream of time-stamped sampled data 27. The data is time-stamped with high-accuracy, which in this embodiment is accurate to within milliseconds. The time-stamping will be described below in detail with reference to Figure X.

The output of the ADC 20 provides an input to processing means in the form of a micro-processor 30 that has RAM 35 associated therewith and accessible thereby. The device also includes storage means in the form of non-volatile memory 40, which in in this embodiment is flash memory. The micro-processor 40 is arranged to communicate with the NVM 40 to read data therefrom and store data thereto. The device 10 further includes communication means in the form of a radio module 50 in operatively coupled to the micro-processor 30 and arranged to communicate in accordance with GSM and GPRS standards over a mobile cellular telephone network (not shown in FIG. 2).

Each device 10 of the system 100 has one or more input channels of data streaming from respective sensors 12.

Although FIG. 2 shows, for simplicity, a device 10 with a single sensor 12 and a single channel of data therefrom, it is envisaged that other devices 10 in the system 100 may have multiple sensors 12 each sensing different variable indicative of fluid flow. Each sensor 12 has a respective stream of continuous data therefrom, with each treated as an independent variable in a separate channel of the device 10. The sampling rates might be different for specific variables: for example: fluid pressure is measured at 200 S/s and fluid flow velocity at 1 S/s whereas temperature or battery voltage may be measured only once every 15 minutes. Water quality variables (chlorine and turbidity) are sampled at 15 mins but a faster sampling rate is triggered (5 mins) if a transient is detected. Pressure can be used as a primary variable to trigger an increased sampling rate for the secondary variables. Data sources may also be generated by calculations upon one or more other data sources. For example, a boolean data source (one which may only have the values "true" and "false") representing the statement "a transient has been detected" may be generated from a fluid pressure data source.

Figure 3:
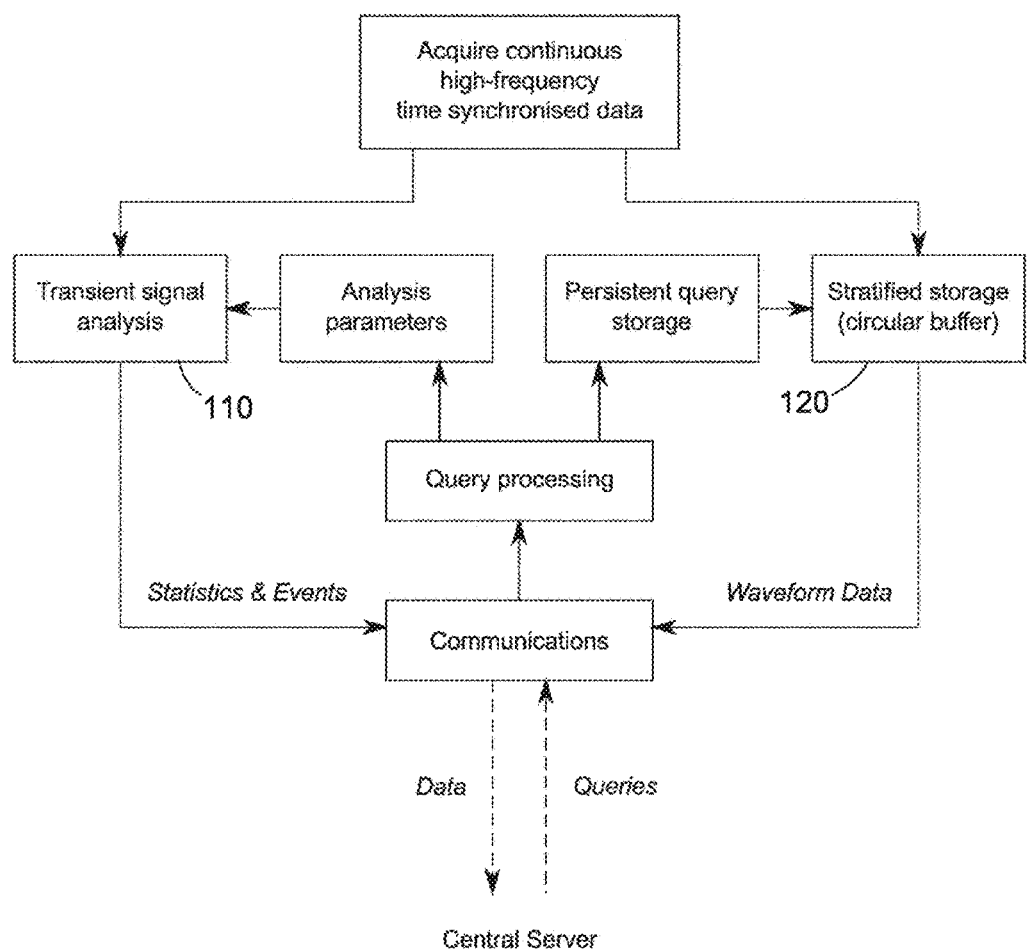
FIG. 3 is a schematic diagram of the operation of the remote device of FIG. 1.

With reference to FIG. 3, which illustrates data flows in the device 10 rather than the hardware arrangement, time-stamped sampled data from the ADC 20 undergoes two main processing operations: transient signal analysis 110, in which the microprocessor 30 extracts information from the signal; and stratified storage 120, in which the time-stamped data from the ADC 20 is subsampled by the microprocessor 30 into several parallel subsampled streams and stored in the non-volatile memory 40, available for retrieval at a later date. This model is designed to sustain continuous sampling at high sampling rates while minimizing energy use and communication. The system operation is configured via "queries", commands and requests sent from the central server 200 with which the device 10 communicates via the radio module 50. These queries set the parameters of the transient signal analysis 110 and define what data is regularly transmitted by the device 10 using "persistent queries": queries that are stored on the device 10 and which continue running until being stopped by another query. The results of the transient signal analysis and data generated by queries are transmitted to the central server 200

[Stratified Storage]

Figure 4:
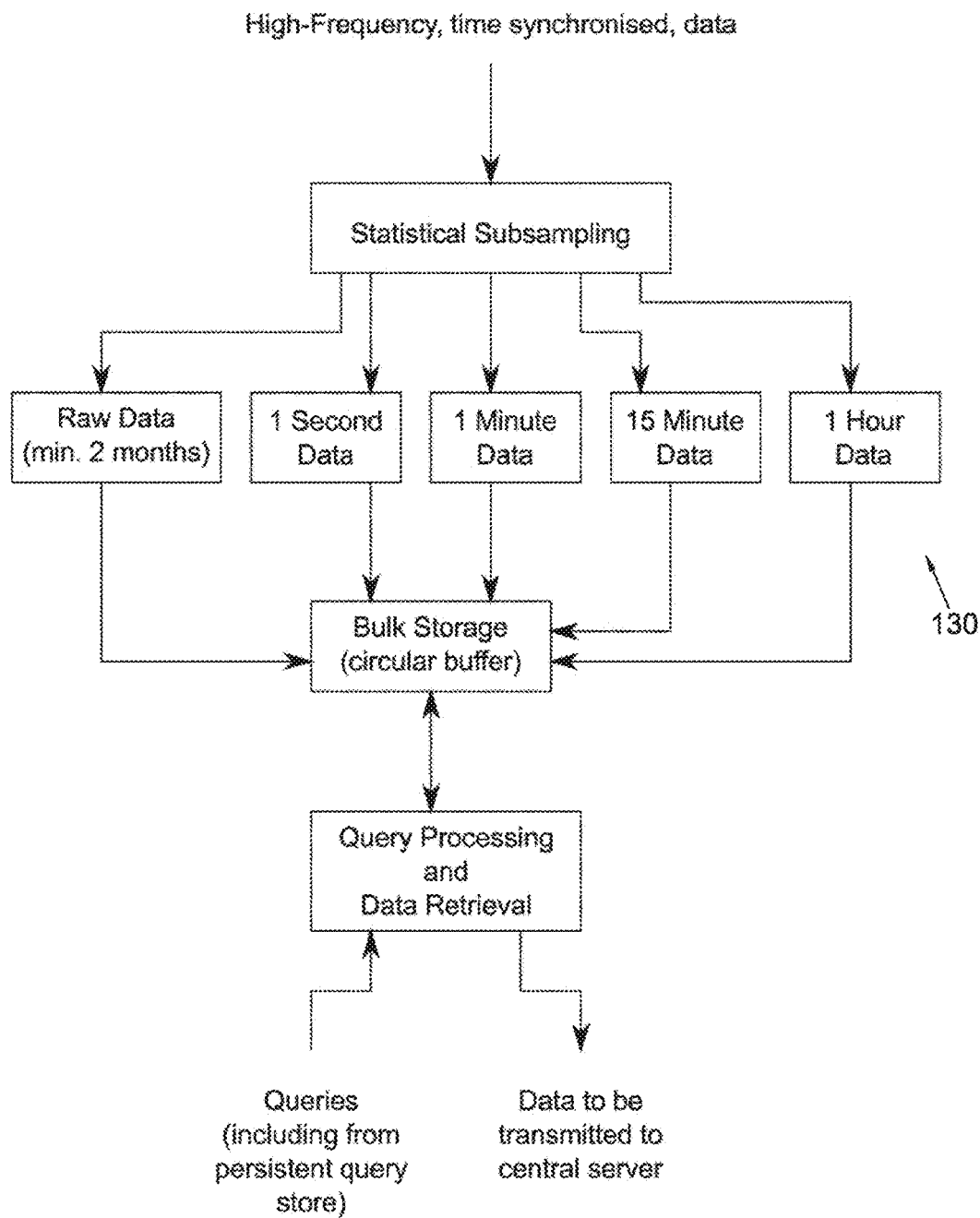
FIG. 4 is a detailed schematic detailed diagram of one part of the operation the remote device of FIG. 2.

The developed "stratified storage" system is shown in FIG. 4. Each sensed variable (from a respective sensor 12) in the device 10, after being sampled by the ADC 20, is stored as a "stratified stream". Thus, there will be as many stratified streams as there are sensors 12. A stratified stream 130 is shown in FIG. 4 that is representative of the stratified streams in this embodiment. The stratified stream 130 contains the raw data from the ADC 20 and several subsampled streams, subsampled by the microprocessor 30, of data stored in parallel with the raw data. The subsampled streams are made up of many data sets. Each data set in a subsampled stream consists of a tuple made up of the time of the beginning of the subsampled item and a number of statistical descriptors of the raw data over the time that is covered by the data set item.

The type of statistical subsampling that is performed by the microprocessor 30 depends upon the type of data: for continuously variable data the minimum, maximum, mean and variance values are calculated; for boolean data the logical OR of the data items may be calculated. Other statistical values, such as standard deviation, may also be calculated when generating a subsampled set. Table 1 in FIG. 19 shows a data source that takes a reading once every 15 seconds and the one minute statistical subsample that it is envisaged be created from it.

These subsampled streams allow long periods of data to be retrieved without the large number of data accesses that would be required in order to obtain information for the same period of time given only access to the raw data. This is critical for minimizing communication time and energy while managing high volumes of data. For example, one hour of 200 S/s data would require 720,000 data reads if only the raw data was available but only 60 reads of a one minute subsampled set.

Raw data, and thus the subsampled data sets, are stored in the order that they are measured. Each data stream is therefore sorted by increasing time value. This allows the data at a particular time value to be found without the use of an index since an efficient binary search (half interval search) algorithm may be used. The storage medium is a circular buffer, newly recorded items of data will therefore always be stored on it. If the medium is full then the oldest data will be deleted in order to make room. Once written, data will never be modified. Data copied from a device 10 may therefore be considered reliable regardless of what happens to the device subsequently. The use of subsampled sets does incur a storage penalty, typically between 5% and 10%, but this is insignificant given the low cost of storage.

[Transient Signal Analysis]

Figure 5:
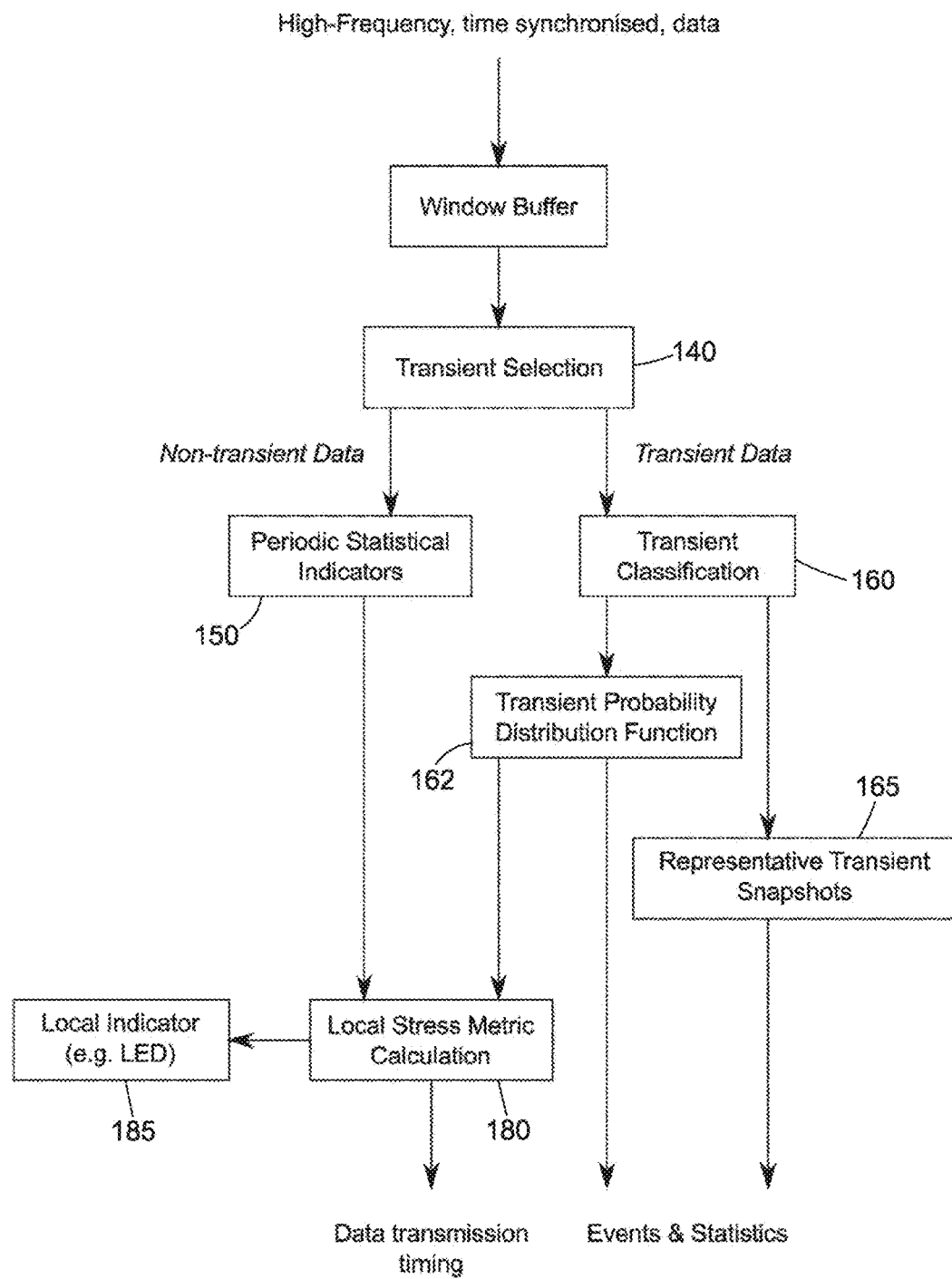
FIG. 5 is a detailed schematic detailed diagram of another part the operation of the remote device of FIG. 2.

In parallel with the stratified storage system described above each device 10 also performs data analysis on the raw (streaming) data as it is provided from the ADC 20. This is shown in FIG. 5. These processing operations are carried out in parallel on every data source measured by the device 10.

The RAM 35 and the processing power of each device 10 is limited and so all mathematical operations take place over a rolling window buffer. The size of this buffer is implementation specific but it will typically be in the range of 30 seconds (s) to 300 s: long enough to hold a complete image of the longest transient (the maximum duration of a transient depends upon a number of factors such as the system topology, pipe size, the nature and source of the transient event etc). In this embodiment, and for data indicative of water pressure, the buffer is 300 s.

After filtering out sensor noise (e.g. using a moving average) the first data processing task is the "transient selection" functional block 140. This includes dividing the data into probable transients and probable non-transients. The assumption is made that over the short period of time of the window buffer, the average signal value will not change and so the sum of the differences will always be approximately zero. A cumulative distribution function (CDF) of the sum of the differences between subsequent samples in the window is built. The CDF is a record of the value of the sums against their probability of occurring, based on the measured frequency of occurrence. If the sum is "unlikely" according to the CDF (e.g. <0.1% chance) then the window is declared as holding a transient. The more data that passes through the system the better the CDF becomes. This approach allows transients that are barely above the noise floor of a signal to be detected, in sharp contrast to transient detection on existing devices, which are generally simple slope detectors and which only detect large transients. The present approach also is self-tuning and hence site specific.

Summary statistics ("Periodic Statistical Indicators") such as minimum, maximum, mean and variance/standard deviation are collected from the non-transient signal for each day of the week. This is illustrated in functional block 150. These are stored locally as well as being transmitted to the central server periodically. In the present embodiment all of these statistics are collected.

The "transient classification" task of block 160 fits a set of variables to a detected transient (detected in block 140) in order to provide a compressed descriptor of the event (e.g. a transient vector). An example set of fitted variables on top of a measured transient may be seen in system FIG. 7. This shows a plot of the pressure as measured by the sensor 12 and sampled by the ADC 20 on the y-axis against time on the x-axis. Descriptors in this embodiment include the amplitude of the transient (also known as the start magnitude), the gradient of the transient (not shown on FIG. 7), the dissipation gradient of the transient, which can be considered the slope from the first peak or trough of the transient to a point at which the transient has substantially dissipated and the sequence of alternating gradients. For each descriptor, with the exception of the time of the transient (which will obviously be different for every transient), the value of the descriptor is used to build up a probability distribution function (PDF). This is done at block 162. This PDF shows the probability of a particular type of transient occurring and is periodically (for example, once every 24 hours). These PDFs are sent to the central server 200. As the device 10 runs, the PDF becomes more accurate as more data is aggregated.

Using the transient PDF, sets of variables, this time including their start time, describing representative transients are collected and sent to the central server 200. This is done at block 165. A representative transient is one which is repeated regularly or which is "unusual" (low probability) according to the transient PDF. The central server uses these snapshots of transients in order to cross-correlate events from different measurement locations.

The periodic statistical indicators and transient PDF are used to calculate a simple "impact metric" on the logger. This is done at block 180. This impact metric uses assumptions about the physical properties of average pipes in order to classify the amount of stress, in colloquial terms, the pipe section being measured is under into a limited number of states. This information can then be displayed on display means of the device 10 (in this embodiment, the device further comprises a removable memory module that houses the NVM 40 and includes three differently-coloured LEDs which are used to indicate the impact metric at block 185) in order to allow technicians in the field to assess the condition of the network at that point. For devices 10 which are unable to communicate with the central server 200 and which rely on manual collection of the memory modules, this indication of local "stress" can show whether or not it is worth collecting the memory module at a particular time. The local impact metric can also be used to vary the rate of data transmission: when extreme transients, those which cause a high impact metric, are detected the device 10 may automatically be set to transmit event data to the central server immediately rather than waiting for its normal transmission time. The local impact metric is ranked using a traffic light system. Red alerts are used to trigger immediate communication with the central server 200.

[Central Processing]

Figure 6:
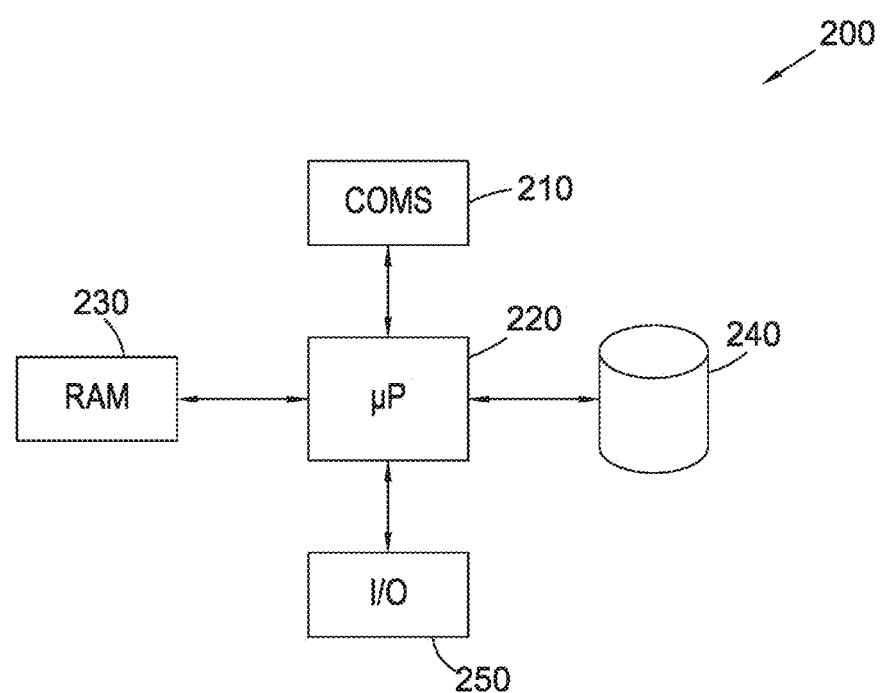
FIG. 6 is a schematic diagram of the hardware arrangement of the central server.

The central server 200 is shown in schematic form in FIG. 6. The server 200 includes communication means in the form of a module 210 arranged to communicate with the internet, and hence with each device 10, by any suitable means for communication. The server 200 also includes a microprocessor 220 in communication with the radio module 210, and RAM 230 and non-volatile memory 240 both of which are in read/write communication with the microprocessor 220. The NVM 240 constitutes a central data store 240. Input/output means in the form of a graphical user interface 250 are also provided.

Figure 7:
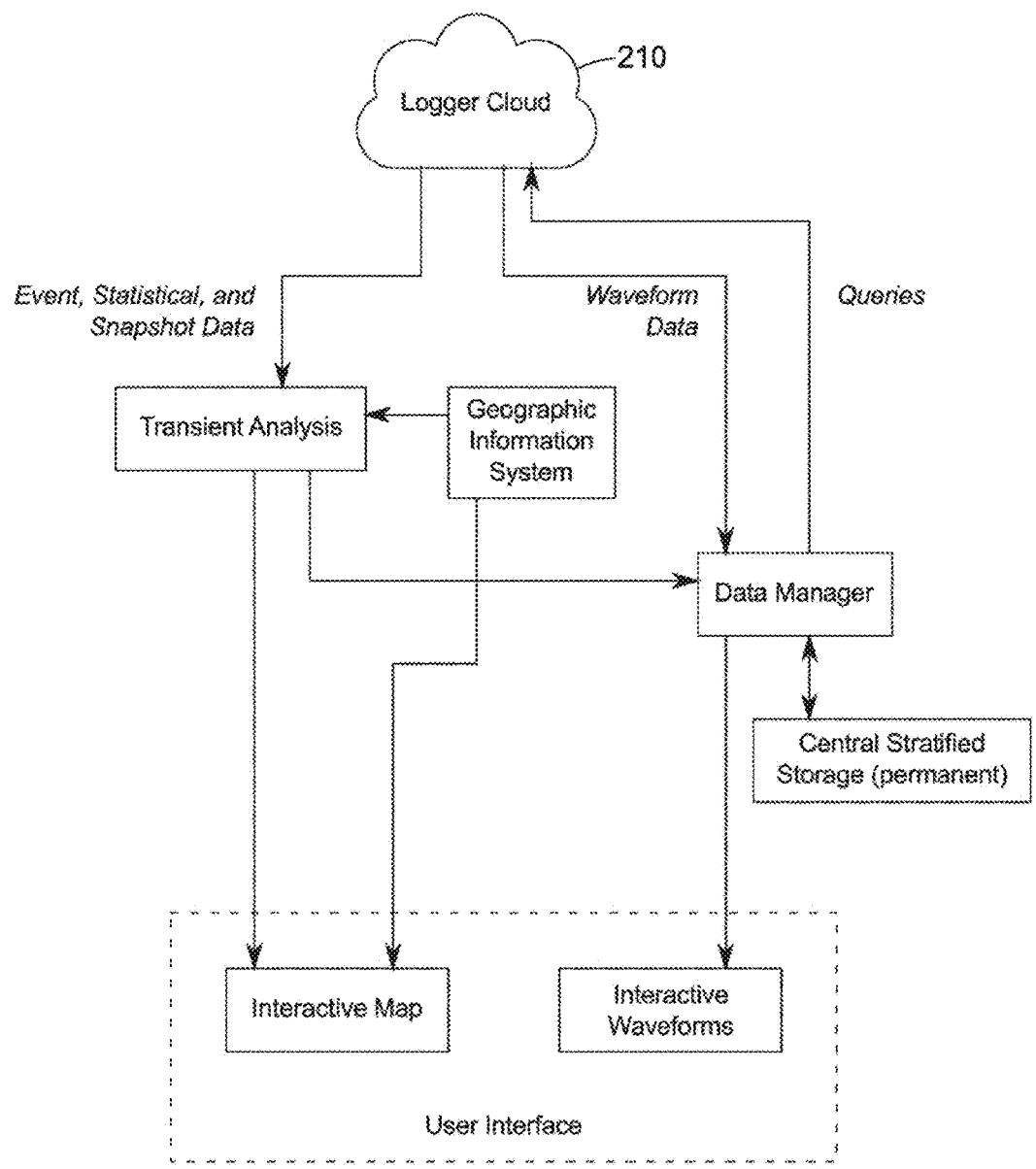
FIG. 7 is a schematic diagram of operation of the central control station.
Figure 8:
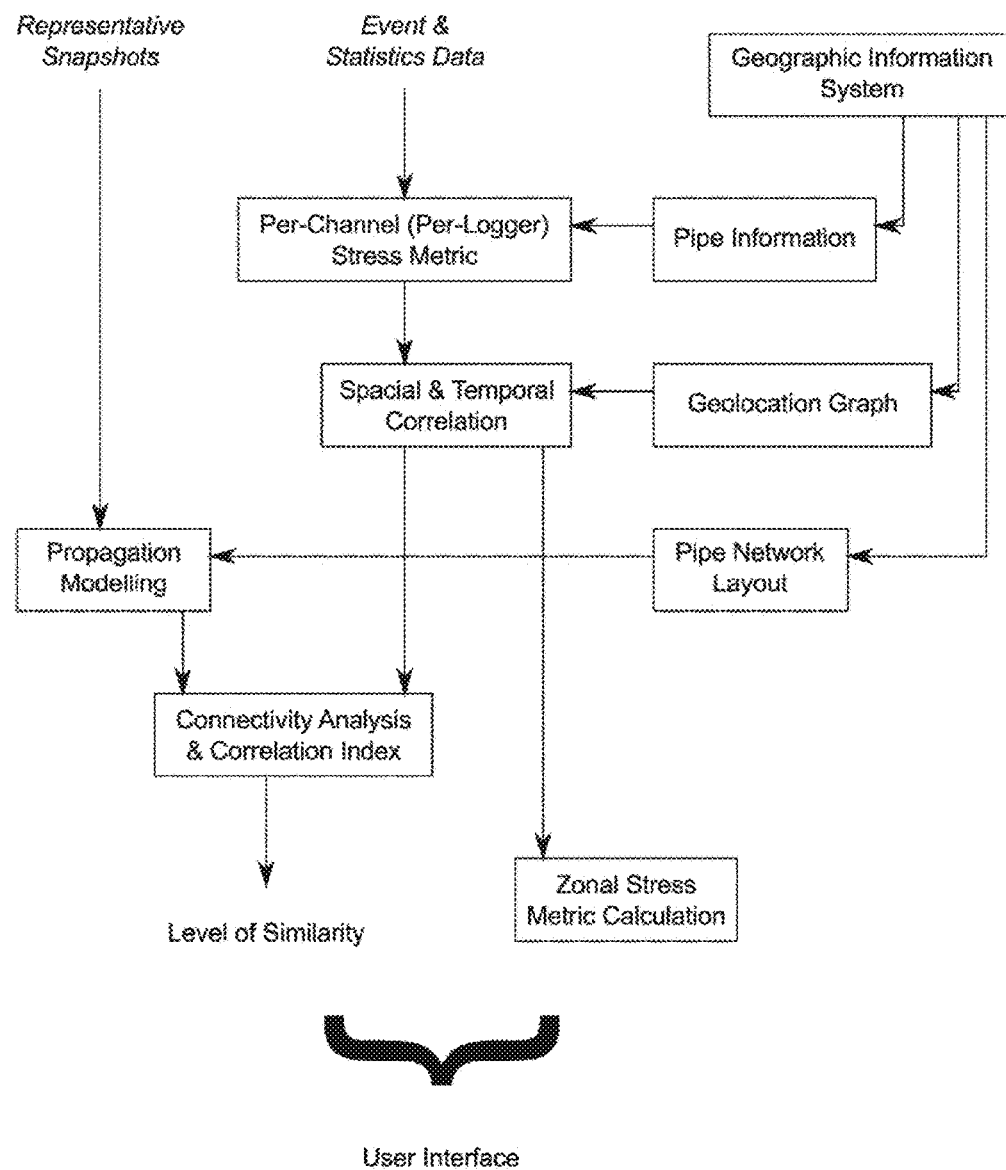
FIG. 8 is a detailed schematic diagram of part of the operation of central control station.
Figure 9:
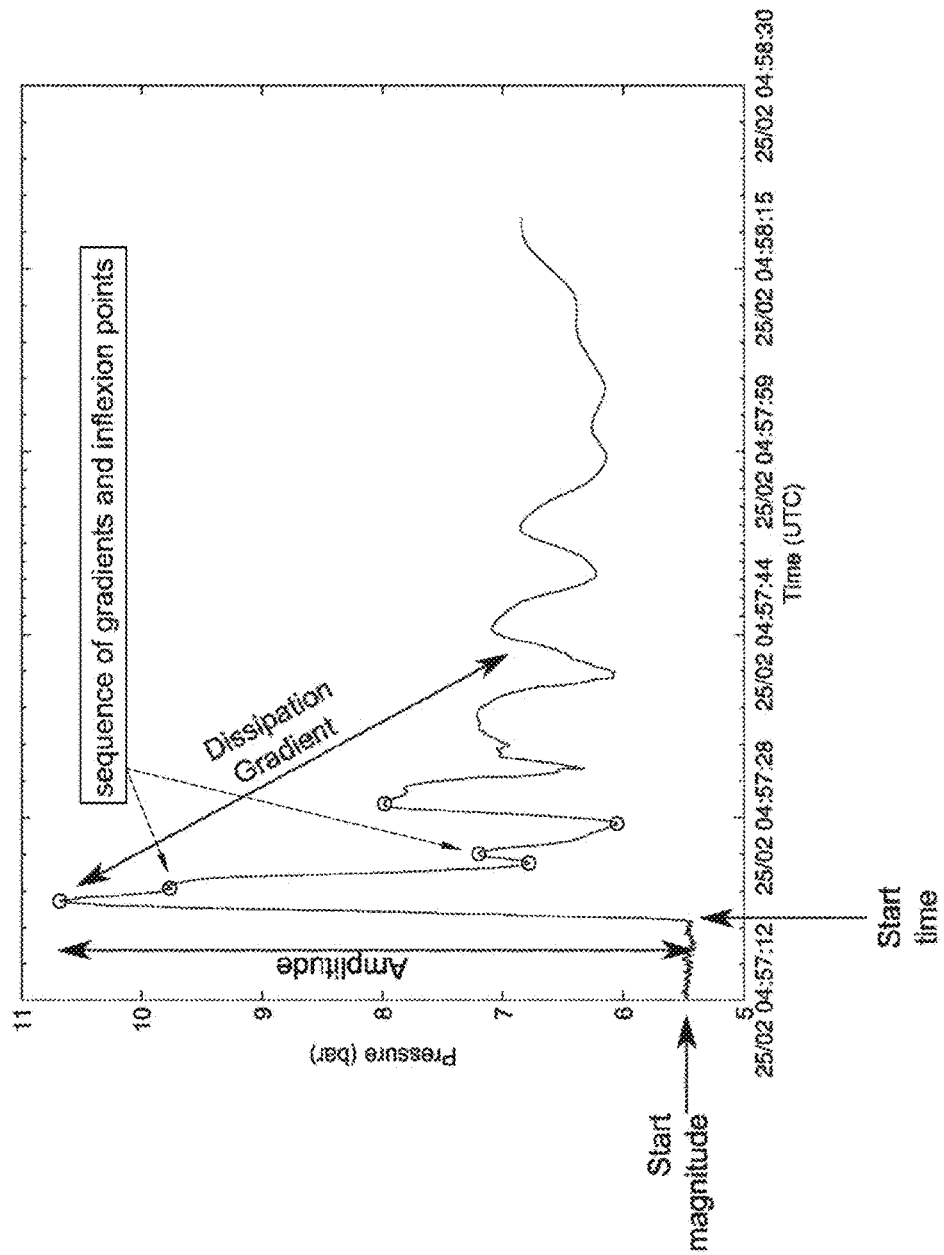
FIG. 9 shows a representation of a transient event with transient descriptors.

An overview of the functional arrangement of the central server is shown in FIG. 7. The server 200 receives data consisting of events, transient statistics, and waveform data from all of the loggers under its control—the "logger cloud" 210—via the internet module 210.

The central server 200 performs two main tasks: storing and requesting data from the loggers 10 in its permanent data store; and combining the transient analysis data from all of the loggers into network wide analyses. It also provides a user interface consisting of interactive graphs, for viewing sensor data, and an interactive map, for displaying geographically located data. It is envisaged that the central server also occasionally extracts snippets of high-frequency data from various locations (detected transients with different severity) to tune and update the transient estimators. In this way, the Sever/monitoring system autonomously improves its detection capabilities. The updated transient estimators are then "pushed back" to the embedded monitoring devices.

The central data store 240 on the server has the same structure as the stratified data stores on the devices 10 but it is significantly larger and not structured as a circular buffer. Old data will not get overwritten. When data is requested from devices 10 it is copied into this store and maintained as a permanent record.

A key aspect of the data storage system 240 on the central server 200 is the concept of "retrospective data retrieval and query of high frequency data for arbitrary periods of time". If the user wishes to view detailed information from the past following an alert they may send queries out to the logger cloud in order to retrieve past data with higher spatial resolution from one or more loggers. In this way the user may view arbitrarily detailed data from the loggers without the loggers having to constantly transmit high bandwidth information to the central server. The process is iterative—a user receives the traditional 15 mins data together with a low resolution transient event data, the transient event requires further investigation and the user then issues retroactive queries to extract past data with high temporal resolution for the specific events/time intervals. Retrospective data retrieval may also be triggered by automatic analysis routines running on the server: for example, if a transient is detected on one device 10 than an automatic query is generated to extract data from neighbouring devices 10 in the local network surrounding. The data is then used to locate the source of the event, investigate hydraulic connectivity within complex topology systems and diagnose the performance of surge protection devices.

A geographical information system (GIS) provides information on pipe materials and diameters, network layout, logger location, and information such as photos and notes used when planning logger deployments.

The central server 200 receives periodic statistical indicators, transient PDFs and transient classifications along with representative snapshots from each device 10. Where devices 10 have more than one measurement channel each channel is treated as though it were a separate device 10 for analysis purposes (although the data for all the channels on a particular device 10 is, in this embodiment, transmitted over the communications link together for efficiency). The analyses performed upon these data are shown in FIG. 6.

The data from each device 10 is combined with simple pipe information (material, age, diameter and probable condition, if known) from the GIS in order to calculate a per-logger impact metric, using the same methods as used on the device 10 itself.

Figure 10:
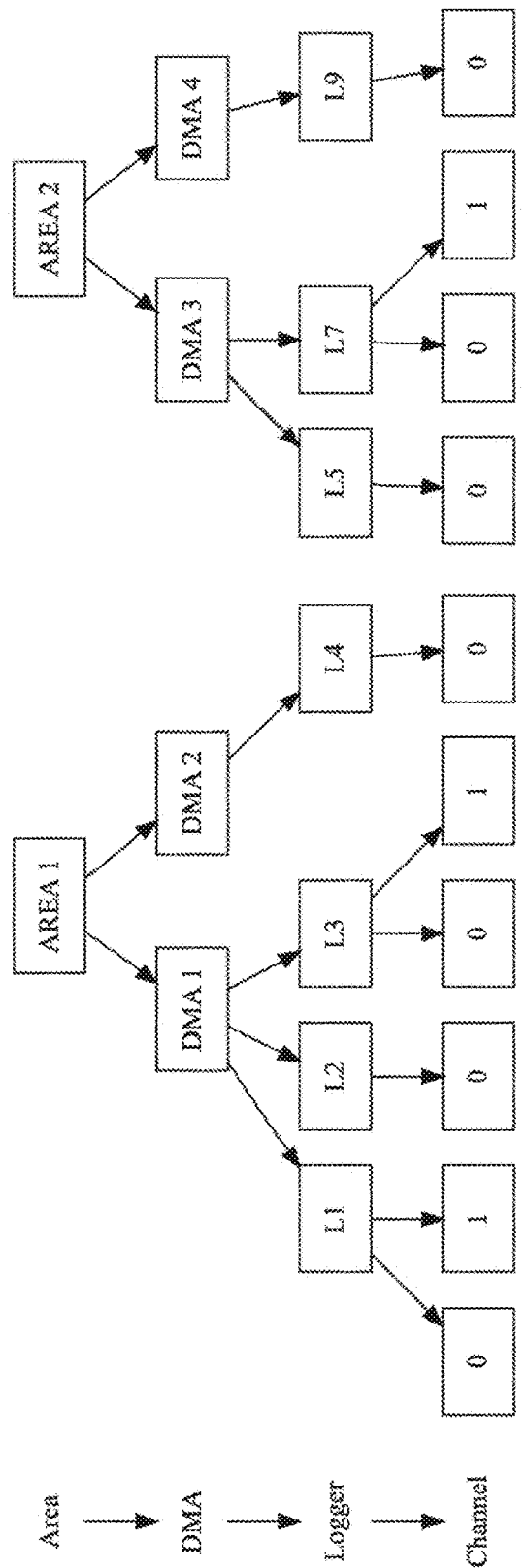
FIG. 10 is a schematic representation of the geolocation of components of the system.

The location of each device is known and these locations are arranged into a hierarchical geolocation graph which stores the relationships of these locations to each other. An example graph is shown in system FIG. 10. For the purposes of zonal analysis the actual GPS location of each device 10 is not used, just the relationships described in the geolocation graph. The GPS location is, however, used for visualization of the data. In the example graph channels 0 and 1 of device "L1" are considered to be closely related since they share the same parent. Channel 0 of "L1" and channel 0 of "L2" are less closely related since they only share a grandparent. Both are considered barely related to channel 0 of "L4" (common great-grandparent) and not related at all to channel 0 of "L9" (no common ancestor).

The timestamps on the representative transient snapshots are used in order to try and identify the same transients occurring at different sites. The time difference between and magnitude of the transients is used to rank sites by closeness to transient source.

The final stage of this analysis is to combine the per-device impact metrics, closeness to transient source, and position on the geolocation graph into "zonal impact metrics". At each level on the geolocation tree a weighted average of the impact metrics ("worse" metrics have a higher weight than "good" metrics) of the nodes below that level gives a zonal impact metric. These zonal metrics may be plotted on a map, allowing a user to see at a glance the stressed sections of network over a large geographical area using a traffic light system, and to zoom in down to the level of an individual logger. In addition, the acquired data can be used to identify the probability of burst frequency with relation to the extracted "stress" indicator. This will assist network operators in selecting the optimal control strategy to minimise the dynamic hydraulic behaviour in their systems and quantify the benefits of such proactive management.

In parallel with the statistical analysis the transient snapshots transmitted by the loggers may be used to drive a transient analysis model in order to predict their propagation around the network. The periodic execution of these transient simulations based on the acquired high-frequency time-synchronized data will provide snapshots of the modelled vs observed transient response of the systems. The analysis of these residuals is used to identify and diagnose failures and sub-optimal operation. For example, a hydraulic connectivity between parts of the network as a valve has been left open or even a section of pipe which is not recorded on the network map.

The metrics and links between devices 10 may be used with traditional data visualization in order to automatically select data sources: for example, a user may zoom into a dataset in order to view a transient and be able to ask the system to automatically display the datasets of all other loggers that also measured the transient. If this data isn't currently available on the central server then requests may be sent in order to retrospectively retrieve the high-frequency data.

The initial settings of the various parameters that control the processing such as the transient/non-transient CDF threshold are calculated using a period of raw data collected at a representative site (not necessarily in the zone that is being logged) and processed on the central server 200. Over the runtime of the device 10 these parameters are updated wirelessly from the central server 200.

[Manual and Remote (Wireless) Data Management]

The system of the present embodiment supports both permanent and temporary monitoring installations. The device 10 in this embodiment includes a memory and communications add-on module (shown at 45 in FIG. 11) which enables flexible and optimal data handling for a wireless monitoring scenario by remote interrogation and a local interrogation scenario by physical inspection in the field. The memory and communications module 45 is external to the main sensing and data acquisition module 46 and it can be replaced in situ. This eliminates time consuming data downloads if access to large volumes of data or all of the acquired high-frequency data are required for analysis (or if wireless communication is not available). Low cost communication and memory upgrades can also be done with minimum disruption to the end user, the running monitoring/control tasks and the installation setup. For permanent installations (telemetry/SCADA systems), the remote access and data transfer can be done via GSM or any wireless and/or wired communication technology. In this setup, several of the devices 10 form a distributed sensing and storage system as described hereinabove.

The memory and communications module 45 supports alternative ways to download and visualize the acquired high-frequency large volume data. These are outlined in FIG. 12.

Figure 12:
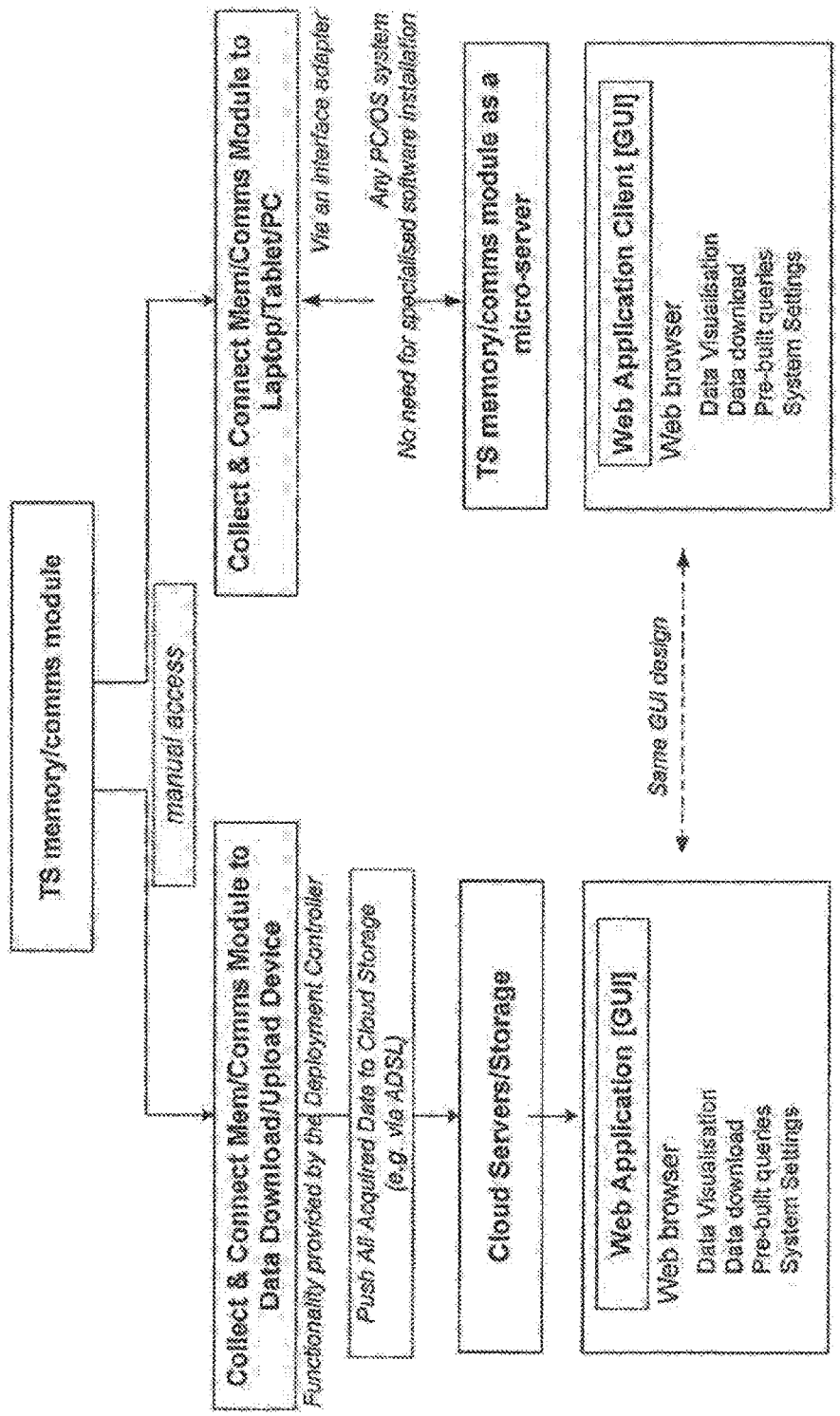
FIG. 12 shows a flow chart of manual access of the device and upload of data.

As shown in FIG. 12, the complete set of the acquired large volume data can be accessed in two ways:

1. The memory and communications add-on module 45 (referred to as the "mem/comms module" in the Figure) is manually collected and connected to the Deployment Controller (DC) which supports automatic data upload to secure/private cloud servers. The DC is a ruggedized laptop or tablet computer arranged for use in the field and for local communication with the device 10. All the stored data on the memory/comms module (including the stratified data structure described hereinabove) are automatically pushed by the DC to private cloud servers for cloud data storage, event processing and data browsing via a high-speed upload link (e.g. ADSL or fibre optic broadband using the DC). A web-based interface allows users to access the cloud services including: (a) spatial/location information related to the logger deployment/s; (b) calibration information regarding the used sensors; (c) a summary/setup of the data acquisition settings and sampling regimes; (d) both raw data and extracted/sub-sampled data sets as described in above; (e) a summary of battery use, status for each battery pack and reminders for replacing batteries; (f) a set of management tools with specific data processing queries and an interface with external modelling and analytical tools.

2. The memory and communications add-on module 45 is a micro-server which provides a seamless interface when connected with external PC devices such as laptops/PCs/tablets. In this way, the raw and stratified data stored on the memory/comms add-on module including the extracted transient events can be accessed without the need of installing specialised software on the host PC. The data management is also independent of the used operating system (e.g. Windows, Linux, Mac OS) and the PC hardware specifications. The web-based interface shares a similar GUI as the web interface outline in Option 1. The GUI allows data to be downloaded to the host PC. However, users do not need to download data in order to view the acquired data and browse specific events and sections of the signal.

Figure 13:
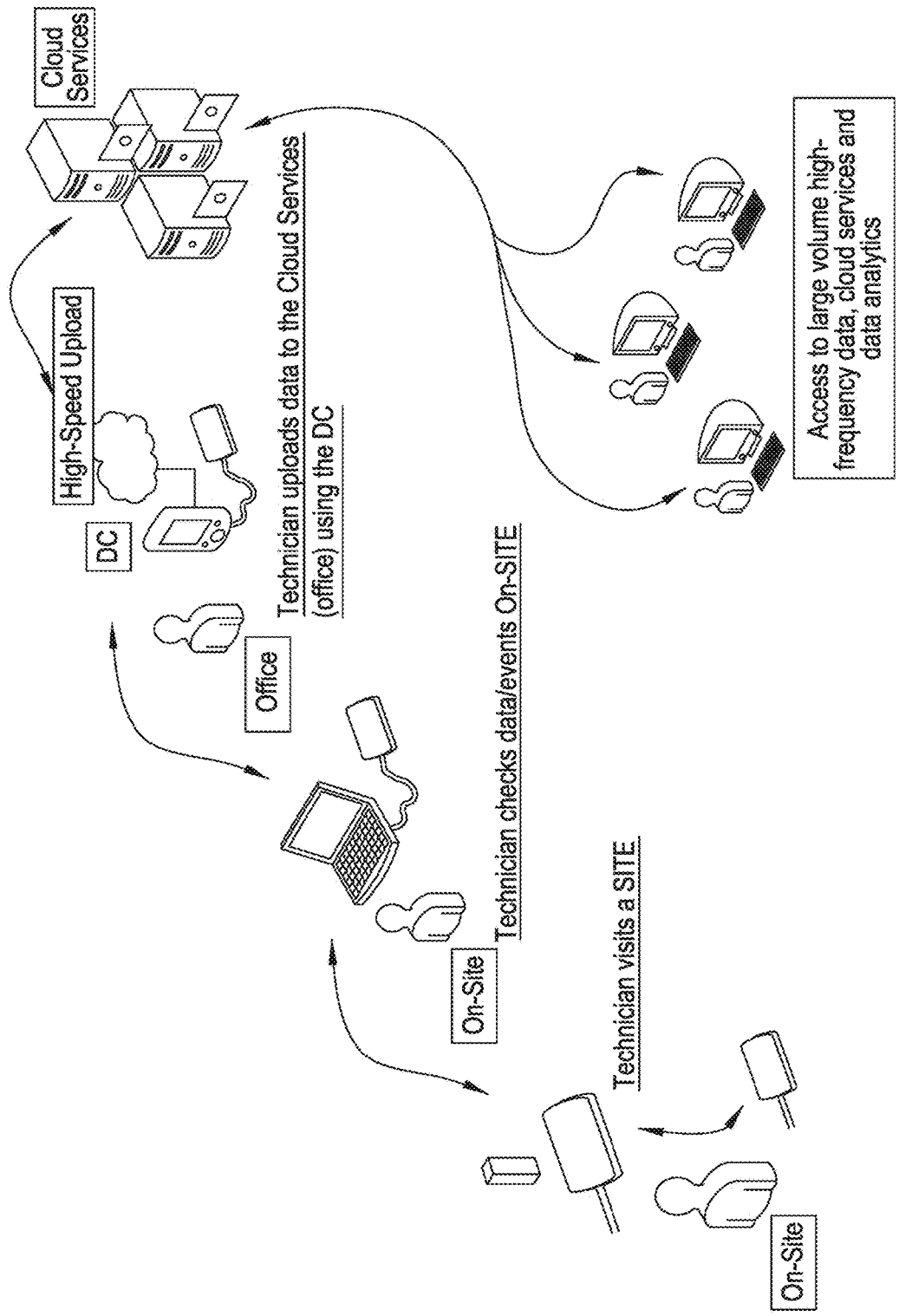
FIG. 13 shows data management procedures of accessing, downloading and processing data.

Furthermore, the present arrangement includes procedures and technologies for accessing, downloading and processing data acquired from temporary sensor installations with no wireless data access or in cases when the full data set is required for tuning the embedded algorithms. These are shown in FIG. 13 and can be summarized as following:

1. A technician visits a site where a device 10 is deployed. The embedded transient algorithm has detected an extreme event or series of events which trigger a red LED (as part of the traffic light warning system) visible through a transparent section of the memory/comms module 45. The technician replaces the memory module 45 with a new module thus minimizing disruptions to the sensors installation setup and downtime for the data acquisition process.

2. The data can be inspected and visualized on site (e.g. in a protected environment such as a service vehicle rather than outdoors) by connecting the memory/comms module 45 to a ruggedized laptop/tablet. The connection is either via a cable or a 802.11 WiFi add-on module that can be connected to the memory/comms module 45. It is also envisaged to connect the memory module to the DC and have that host a micro server (rather than having the micro-server in the memory module itself) which a laptop can connect to via cable (e.g. ethernet/USB) or wirelessly (e.g. WiFi/Bluetooth). No specialised software is required to access, visualize or browse the data on the memory module 45—this is facilitated by the stratified storage model described hereinabove.

3. The technician can also take the memory/comms module 45 to an office with access to high speed data networks (e.g. ADSL, fibre optic broadband)or use high speed wireless services such as 4G The memory/comm module 45 is connected to the Deployment Controller which is used to push the data to custom designed cloud services for cloud data storage, event processing and data browsing

[Time Stamping; Modifying Clock Drift; Correcting Clock at Runtime]

Accurate and stable time synchronization of the devices 10 that form the system is provided in order to continuously analyse the quasi-steady state and transient hydraulic conditions in the water supply system. With reference to FIG. 2, the device 10 includes a clock module 90. This provided the present system with a time synchronization solution for the distributed high-frequency monitoring. The clock module 90 incorporates a radio time-signal receiver, an oscillator and embedded signal processing algorithms that sustain time synchronization accuracy of up to 5 ms among distributed sensing devices.

Figure 14:
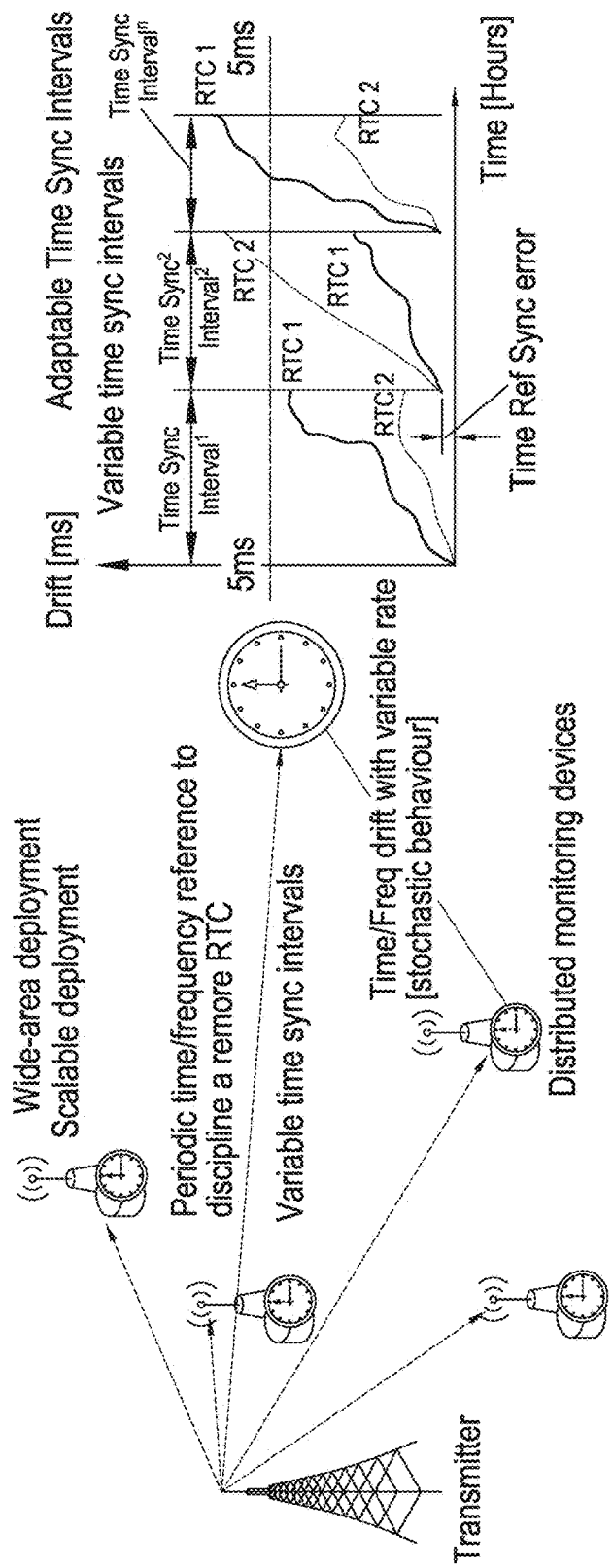
FIG. 14 shows time-synchronization for wide area monitoring.

With reference to FIG. 14, by utilizing an out-of-band time source a scalable, topology-independent and fast-convergent time synchronization service, which supports wide area sparse networks of sensors, is achieved. With continued reference to FIG. 14, the present distributed monitoring and control system implements a real-time clock (RTC) for time-keeping functions. RTCs commonly integrate a low power crystal oscillator that uses the mechanical resonance of a vibrating crystal of piezoelectric material to create an electrical signal with a precise frequency (e.g. 32.768 kHz). Environmental effects such as temperature, power supply variations and other factors which are typical in harsh industrial environments cause frequency and time period instabilities (e.g. drift and skew) (FIG. 14). The clock performance is measured in parts-per-million (ppm). Low power crystal oscillators (XOs) commonly used in energy constrained distributed sensing systems have frequency stability in the range of 10 ppm to 100 ppm. Recent developments in low-power temperature compensated oscillators (TCXOs) provide improved stability of 0.1 ppm to 10 ppm (Kyocera 2011; Rakon 2011; SiTime 2011). The stability of an XO might result in a time error of 860 ms to 8.6 s over a period of 24 hours while the time error for a TCXO will vary from 86 ms to 860 ms over 24 hours. Within the distributed sensing environment of the present embodiment, the required time accuracy of +/− 5 ms (the equivalent of 0.05 ppm) can only be achieved by using an external signal to provide a reliable time and frequency reference to discipline the local oscillator.

In order to provide the necessary time accuracy and precision, the clock module 90 in each of the devices 10 of the present system is synchronized to UTC (Coordinated Universal Time), which is a global timescale. The use of radio signal broadcasts to discipline embedded crystal oscillators to UTC is recognized as a potential solution to control clock drift. However, there are significant challenges with regards to the application of this approach to the method of the present embodiment of high speed pressure sampling. The main challenges for time synchronizing the described apparatus for continuous high-speed sampling are:

Accurate and robust time synchronization within +/− 5 ms (0.05 ppm) between distributed devices 10 with no direct communication between them (with reference to UTC);

Installation in underground conditions (e.g. manholes, inspection chambers, fire hydrants and washout chambers) with no direct line of sight and complex radio propagation environment. This precludes the use of GPS in the majority of installation locations.

Variable signal quality and jitter of the external radio time/frequency signal within the described operational environment.

Low-power consumption which is achieved by minimizing the number of connections to the external time/frequency reference signal. Consequently, longer holdover periods are required with the option to adaptively control these periods so that the threshold of 5 ms is guaranteed.

The skew of a local crystal oscillator will vary and it might quickly exceed the threshold of 5 ms. For example, a good quality TCXO with 2 ppm accuracy in the range of 0° C. to 40° C. might exceed the +/− 5 ms within 1-2 hours. In order to minimise the energy consumption, the time synchronization with the external time/frequency source should not exceed one session per 24 hours. This is the equivalent of a crystal oscillator with an accuracy of minimum 0.05 ppm and higher. While such devices exist, the energy consumption is significantly higher which limits their use for the described application.

Figure 15:
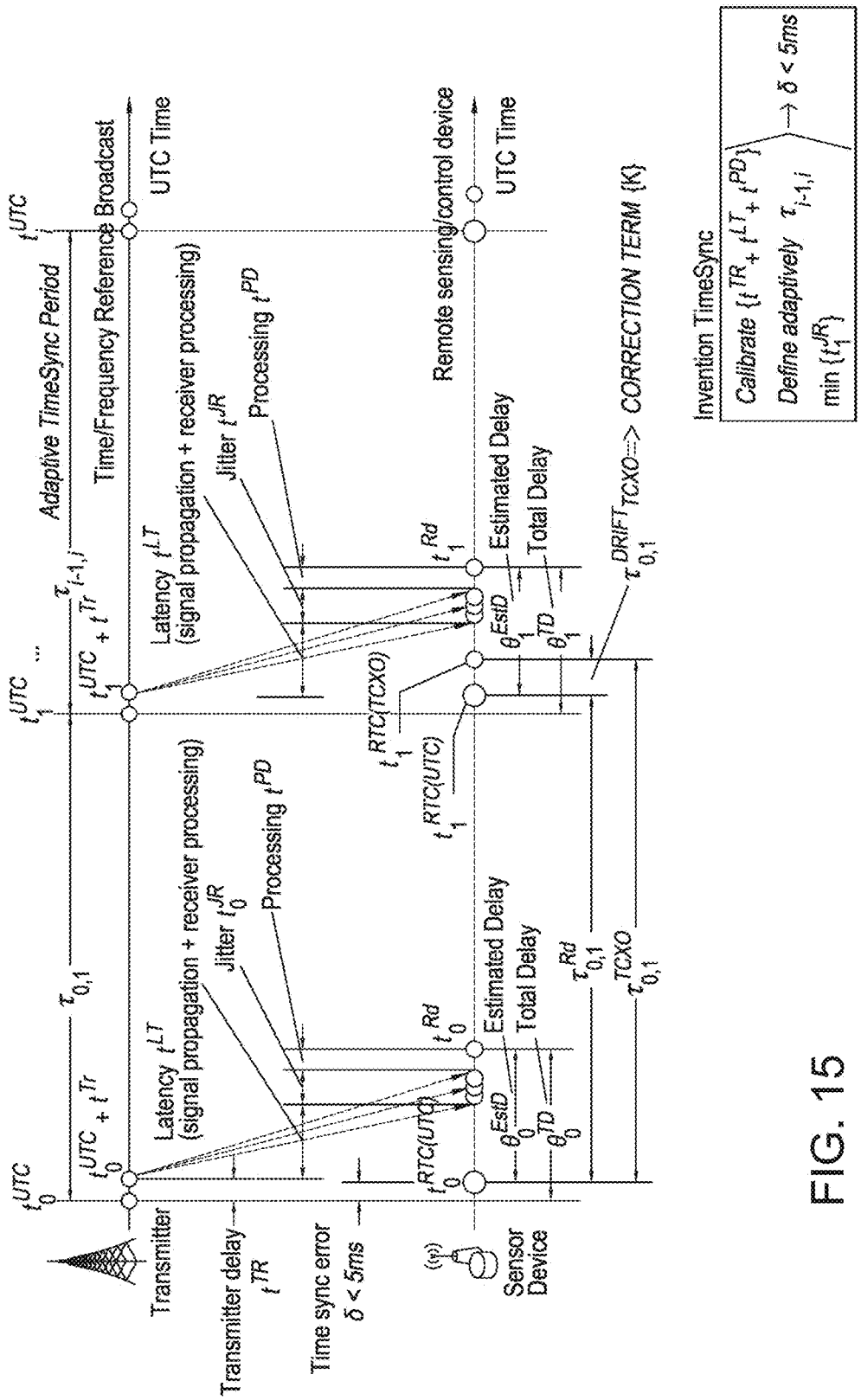
FIG. 15 shows uncertainties in a time broadcast signal.

In addition to extending the holdover periods of operation of a crystal oscillator, a significant challenge is decoding the time reference signal within an operational environment that affects the quality of the received radio signal. Accumulated latency due to processing of the transmitted signal and radio propagation delay combined with jitter may introduce significant offsets in the received time. With reference to FIG. 15, these include:

Transmitter latency ~1 ms

Signal propagation and receiver processing time ~10-100 ms

Jitter ~5-10 ms

Figure 16:
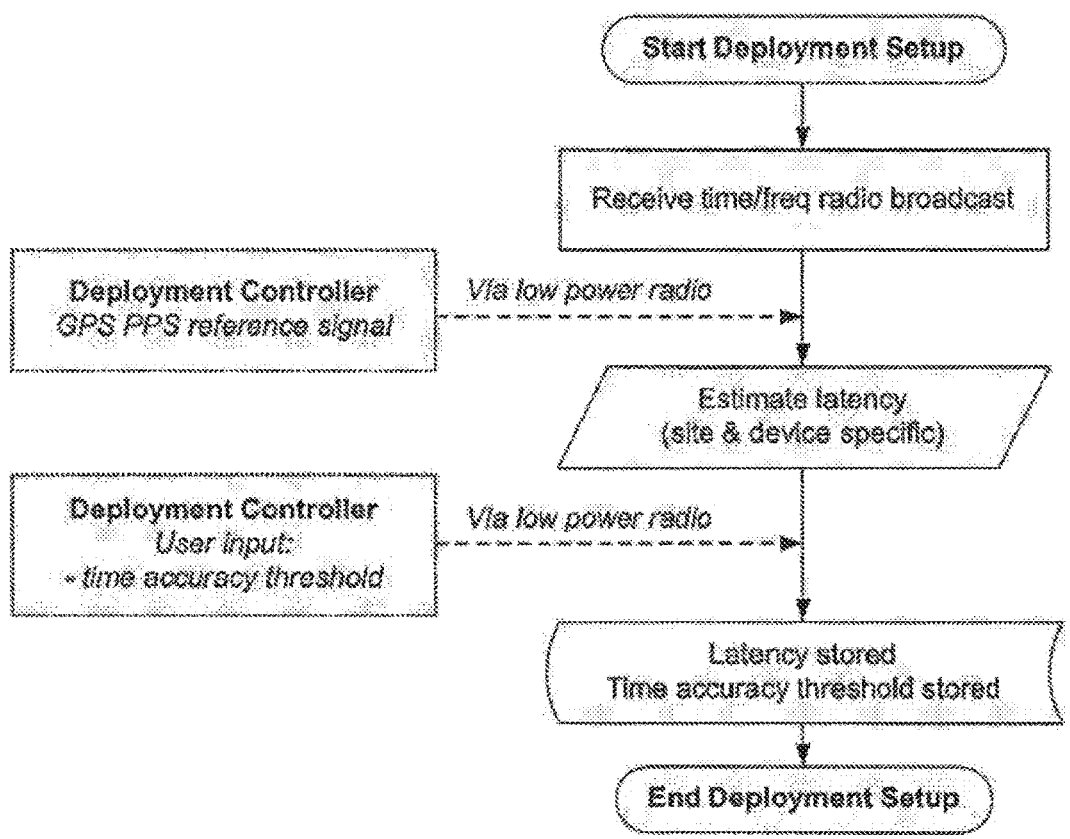
FIG. 16 is a flowchart showing a method of estimating latency.
Figure 17:
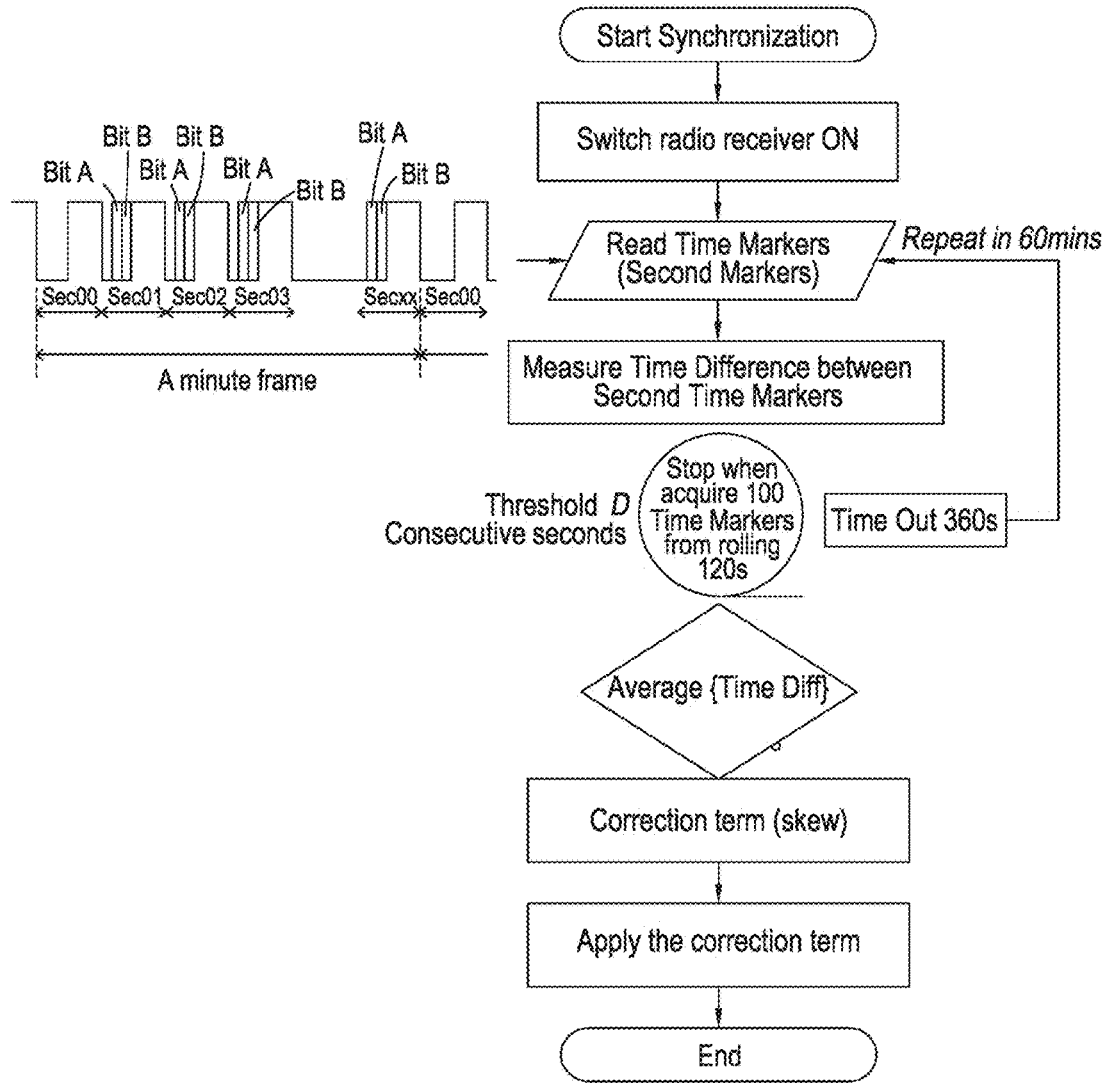
FIG. 17 is a flowchart showing a method to minimise jitter and to decode an accurate time reference.

The arrangement of the present embodiment provides:

A method to estimate the latency for each measuring device during its deployment using the Deployment Controller, as shown in FIG. 16;

A method to estimate and minimise the jitter, as shown in FIG. 17.

A method to receive/decode an accurate time reference without the need to decompose the complete time and date reference code signal, also as shown in FIG. 17.

Figure 18:
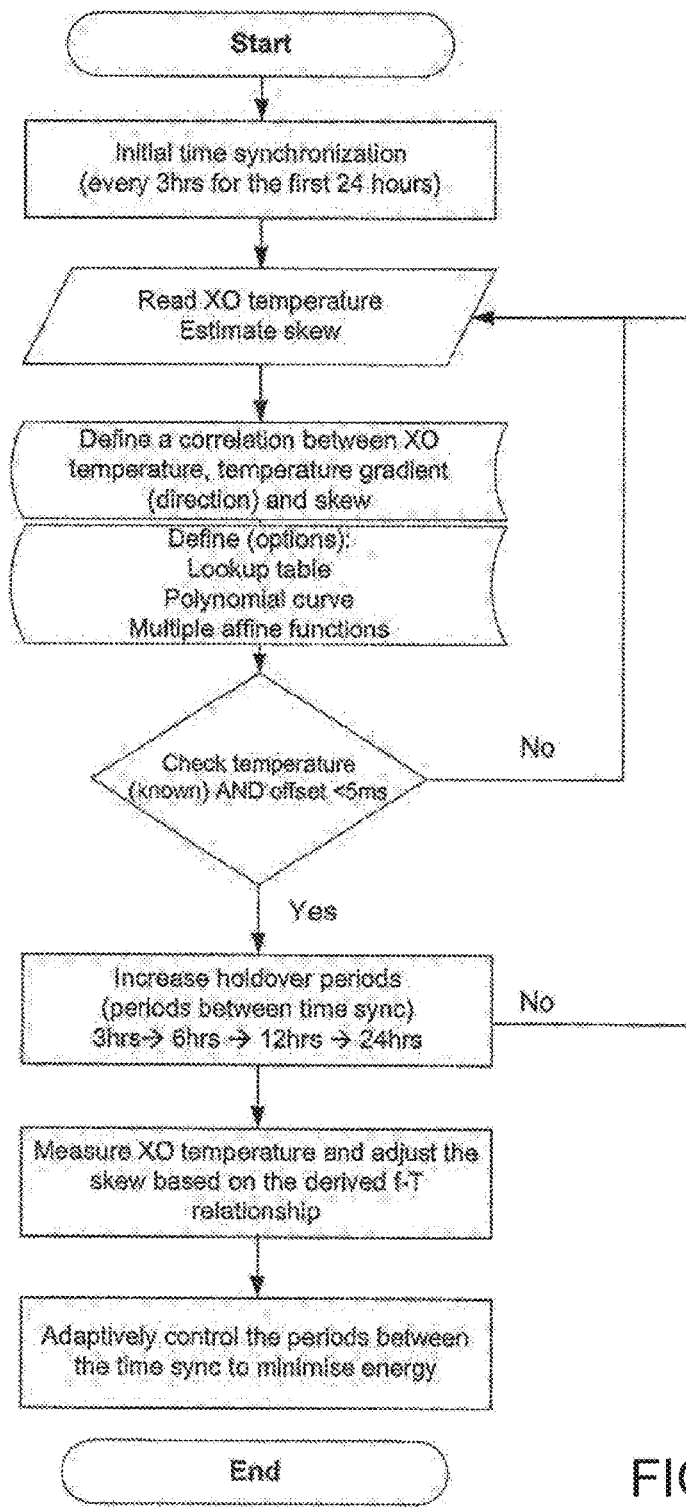
FIG. 18 is a flowchart showing a method of extending a holdover period.

A method to extend the holdover period and improve the performance of the crystal oscillator, as shown in FIG. 18.

A method to adaptively change the time synchronization intervals (holdover periods) to guarantee that a custom defined accuracy threshold (e.g. 5 ms) is maintained, also as shown in FIG. 18.

The clock module 90 of each device 10 is arranged and operable to carry out the steps of these methods.

The method of FIGS. 15 to 18 will now be described in more detail.

The time synchronization of the RTCs (real-time clocks) in the distributed devices includes the use of a common time (Coordinated Universal Time (UTC)) which aligns the offsets between clocks and provides periodic checks to maintain and correct the rate at which the embedded oscillators operate. The devices have no direct communication among themselves and consequently methods of exchanging radio messages to synchronize time are not applicable. The Coordinated Universal Time (UTC) is the primary time standard by which clocks and time are regulated. An RTC is characterized by its time (FIG. 14), offset (the difference in time reported by a clock of a distributed device relative to the reference/UTC time), frequency (the rate at which the clock progresses), skew (the difference in frequencies between a clock and the reference/UTC time; e.g. a stable oscillator has a constant skew) and drift (defined by the change in skew).

The operation of RTC clocks used by the distributed devices and the resulting time accuracy might experience significant variations. The nonlinearity and the phase noise are combined with thermal and supply voltage fluctuations, and aging of the crystal oscillator. As a result, the drift of each RTC differs and it is governed by the initial clock offset, the instantaneous clock skew and additive observation and measurement noise. The uncertainties in these components need to be accurately quantified and minimized as these are device and site specific and also vary in time, FIG. 14.

The uncertainties associated with the time and frequency reference signal which is periodically used to receive the true time (UTC time) are shown in FIG. 15. Time reference signals from various national transmitters can be utilized—for example, MSF in the UK, DCF77 in Germany and WWVB in the US (e.g. amplitude/phase modulated time codes used for the transmission of accurate time data via RF signals). The current embodiment uses a multiband receiver (UK (MSF), Europe/Germany (DCF), USA (WWVB) and JAPAN (JJY)). The presented analysis is based on data received from MSF (UK) bit is applicable to the other listed time broadcasting systems. FIG. 15 shows that a global time reference (UTC) is transmitted at $t_0^{UTC}$ but received at $t_0^{Rd}$ instead of $t_0^{RTC(UTC)}$. The application requirements define that the time synchronization error should not exceed 5 ms ($\delta = \text{diff}\{t_0^{UTC} - t_0^{RTC(UTC)}\} < 5$ ms); however, extensive measurements done by the present inventors show that the total delay in receiving a time reference signal ($\theta_0^{TD} \approx \text{diff}\{t_0^{UTC} - t_0^{Rd}\} \approx 20$ ms $\square$ 350 ms) varies between 20 ms to 350 ms. While this is well within the bounds of is which most Radio Controlled Clocks require, it is an order of magnitude more than the required time synchronization accuracy for analyzing transients. The presented time synchronization solution needs to reliably satisfy the specified time synchronization error bounds, which can also be user defined upon deployment, by systematically assessing and autonomously minimizing the uncertainties associated with: (i) the characteristics and accuracy of the broadcasted time reference signal ($t^{TR}$), the propagation delay and the latency ($t^{LT}$), the jitter ($t_0^{JR}$), the duration (and accuracy) of decoding the time reference signal ($t^{PD}$); and, modeling the behavior and compensating the skew of the local quartz crystal oscillator between synchronizations. This is done by using a periodically estimated correction term so that the time offset within the holdover period ($\tau_{0,1}^{Rd}$) is within 5 ms (diff$\{t_1^{UTC} - t_1^{RTC(TCXO)}\} < 5$ ms) and ideally close to the upper bound of time synchronization (e.g. 5 ms). The main objective is to minimise the power consumption by maximizing the holdover period while maintaining the required time synchronization accuracy among distributed devices. A correction term K for the offset is defined as $K = \tau_{0,1}^{DRIFT_{TCXO}} = \text{diff}\{t_1^{RTC(TCXO)} - t_1^{RTC(UTC)}\}$ which is the difference between the estimated time $t_1^{RTC(TCXO)}$ and received UTC time $t_1^{RTC(UTC)}$.

Embodiments include methods and algorithms to reliably define the estimated delay $\theta_0^{EstD}$ under varying environmental and operational conditions; as $\theta_0^{EstD} = \{t^{TR} + t^{LT} + t^{PD}\} + t_0^{JR}$. In this estimate, the aggregate delay defined by $\{t^{TR} + t^{LT} + t^{PD}\} = \text{Const}^{Cal}$ is approximately constant and it is calibrated on-site as part of the deployment setup using the method outlined in FIG. 16. The jitter measures the variance between successive modulated second time markers which can significantly reduce the accuracy of time synchronization. The time error associated with jitter $t_0^{JR}$ varies with the environmental conditions that affect communication and it needs to be minimized for each synchronization event; the method for minimizing $t_i^{JR}$ is shown in FIG. 17.

It is desirable that an RTC can maintain accurate time or "holdover" between time synchronization events. The longer the holdover interval is the lower the energy consumption is to maintain accurate time synchronization. On the other hand, the holdover interval is limited by the maximum error in time synchronization defined by the application requirements to analyse the propagation of transients; this depends on the drift and skew of the crystal oscillator and the environmental conditions (e.g. temperature) over a relatively short period of time, e.g. hours to days. FIG. 18 describes a method to extend the holdover period and improve the performance of the crystal oscillator. In the current embodiment, a temperature compensated crystal oscillator, TCXO, is used as a trade-off between accuracy and low power consumption. The holdover capability of the described method can range from several hours to several days, thus improving significantly the performance of a TCXO (e.g. from 2 ppm to 0.05 ppm).

The method of estimating the latency Const$^{Cal}$ shown in FIG. 16. This process is carried out during the deployment of the devices and it includes: (i) receive and record the time second markers within the amplitude modulated time broadcast signal for a minimum period of 2 mins (min 120 consecutive time second markers), or an average period of 10 mins by the device (logger) receiver; (ii) receive GPS PPS (pulse-per second) signal by the GPS receiver embedded in the Deployment Controller (the 1 PPS GPS signal is accurate to 1 microsecond) and communicate the GPS PPS signal to the device via wired or wireless link; (iii) calculate the difference between the GPS PPS signal and the time broadcast signal diff $\{GPS_{PPS} - Time_{TB}\}$ for consecutive or cumulative time second markers. Statistical measures and filtering techniques are then applied to define the estimated latency and characterize the initial jitter. During the deployment stage, the user can also define the maximum time accuracy error (e.g. +/− 5 ms for the analysis of transients). The initial RTC time (DD.MM.YYYY HH:MM:SS) is setup using the GPS PPS; this process does not require the decoding of the time broadcast signal.

The method for minimizing the jitter is described in FIG. 17. The radio receiver is powered to acquire a set of time second markers from the amplitude modulated time broadcast signal. The time interval between the time second markers should be exactly 1 s. The local oscillator which has high stability over short periods of time (e.g. minutes) is used to measure the time intervals between consecutive time markers $1-\mu<\text{diff}\{t_{i-1}^{Rd}-t_i^{Rd}\}<1+\mu$, where $\mu$ is an empirical threshold. The frequency stability of the embedded crystal oscillator over short periods of time is estimated during the deployment stage and described by the Allan variance. Experimental data acquired by the present inventors show that the jitter typically follows a Gaussian distribution. The process terminates once a set of time markers are received. The process also terminates if it exceeds a time out period (e.g. 360 s) without successfully acquiring a set of consecutive time second markers; in such cases, the process repeats in a pre-defined interval (e.g. 60 mins). The reason for the time out period is that occasional communication problems might arise, e.g. a vehicle parked over a manhole cover. Based on $1-\mu<\text{diff}\{t_{i-1}^{Rd}-t_i^{Rd}\}<1+\mu$, an average value for $t_i^{JR}$ is calculated. This method has significant advantages over the traditional approach of decoding the time broadcast signal at each time synchronization instance. The method successfully processes weak signals. Weak signals might result in frequent omissions of time second markers, thus significantly extending the time decoding process and energy consumption.

The method of extending the holdover period and improving the performance of the crystal oscillator is presented in FIG. 18. A temperature compensated crystal oscillator is used in this embodiment. The TCXO uses a temperature model to compensate for drift in the oscillator signal over a range of temperatures. This model is accurate within 2 ppm. The performance of a crystal oscillator (e.g. TCXO) can be significantly improved if the a-priori temperature model is calibrated and tuned for the individual oscillator. This is an expensive and time consuming process. The invention updates the temperature model based on the individual oscillator performance and its operational conditions (e.g. the temperature variations within the device enclosure placed in an underground chamber will not significantly vary). Actual error drift measurements acquired from the periodic time synchronization are used to fine tune the temperature model. In this way, an improved performance of ~0.05 ppm can be achieved. The process includes an initial learning stage during which more frequent time synchronization is carried out (e.g. every 3 hrs for the first 24 hours). The device also has a high accuracy temperature sensor located in close proximity to the crystal oscillator; the temperature is measured once every 5 minutes. The measured offset, the calculated skew and measured temperatures are used to derive a correlation between the crystal oscillator, the temperature gradient and the skew. This is done as a lookup table, a polynomial curve or a set of affine functions. As more data become available, the process updates these correlations and self-tunes its values. For example, if the measured offset is within the maximum bounds and the measured temperature is within the known F-T: Frequency-Temperature relationship, then increase the holdover period (e.g. 3 hrs→6 hrs . . . −>24 hrs). If the measured temperature or temperature gradients are outside the range of known relationships, then more frequent time synchronization is carried out to extend the F-T relationship. There might also be a case when the offset value exceeds the maximum error bound of +/− 5 ms for already known relationships; in this case, the acquired data (e.g. pressure) are flagged that the time synchronization cannot be guaranteed over the last holdover period and more frequent time synchronization is established to update the F-T relationships. This method guarantees that the time synchronization process is autonomous and self-tuning by adaptively controlling the periods between time synchronization to optimize energy consumption and required accuracy.

[Mechanical Design]

Figure 11:
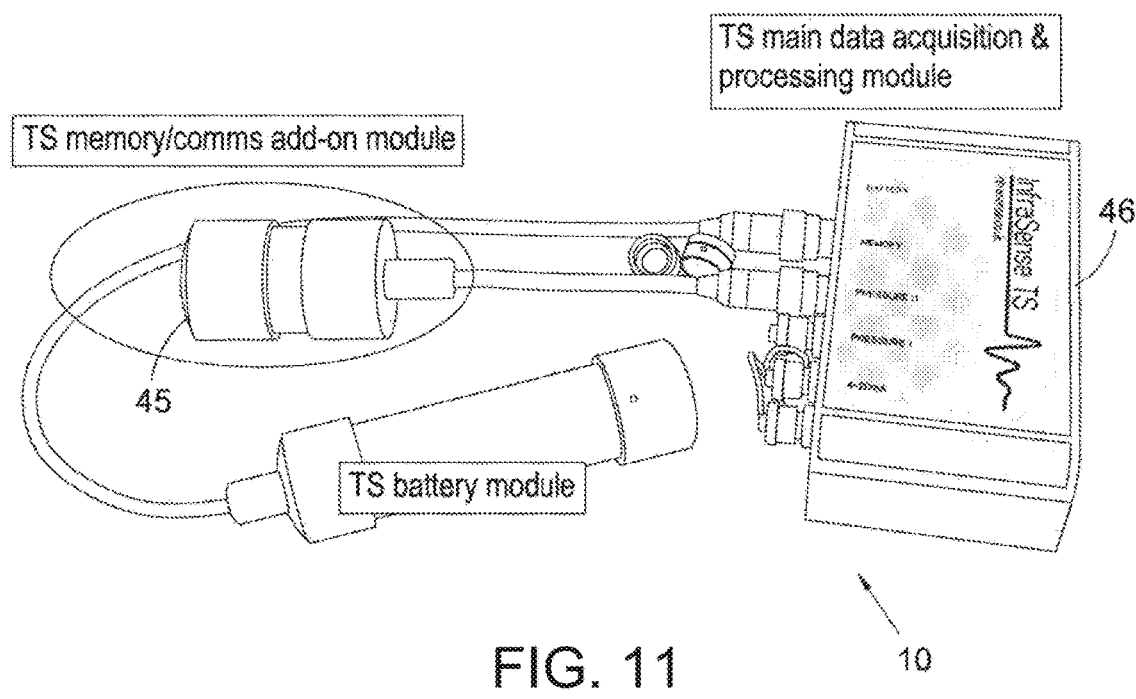
FIG. 11 is a perspective view of modular components of the remote device of FIG. 2.

The devices 10 have a modular design, with separate main processor module 46, battery module 47 and memory module 45 as shown in FIG. 11.

The battery module 47 may be replaced with a power convertor module (not shown) in order to allow the device 10 to be run from any arbitrary fixed power source (or a power harvester such as a micro-turbine). The batteries within the battery module 47 are easily replaced by the end user (this is functionality which existing loggers do not provide). Current data loggers come with separate battery packs but these must be sent back to the manufacturer when the batteries run flat which adds significant costs to the end user. The present embodiment provides an IP68 (very high ingression protection rating) enclosure which an end user could easily open to replace batteries.

The devices 10 have an external (removable) memory module 45. LEDs on the memory module 45 are provided in order to indicate system status, allowing a technician to see whether or not it is necessary to replace the module. This approach also minimizes the installation of additional indicators on the main processor module 46, thus minimizing the risk of water ingress and failures.

Both the memory module 45 and the battery module 47 are air filled and pressurized during production and installation. This reduces the chance of water ingress. It also prevents the units from submerging under water in flooded chambers. During the deployment setup, the pressure in the separate enclosures are measured and checked to certify a safe operation (the safety and equipment checks protocol). The information is displayed to the operator via the Deployment Controller and is also sent to the Central Server.

The various modules may be replaced with other units in order to upgrade critical functionalities such as communication options for the device 10, storage capacity, sensors interface without replacing the main device hardware. For example, a memory module 45 containing a GPRS modem could be used to add communication capabilities to a device that lacked them, which can then be upgraded to LTE at a fraction of the cost in comparison to replacing the complete device 10. This is an important commercial advantage in extending the life cycle of the devices 10 and their functionalities.

[Battery Life Cycle Prediction]

Existing "Smart Battery Systems" consist of a rechargeable cell combined with a digital controller of some sort that monitors battery usage and presents a "State of Charge" (SoC) indication to the system being powered by the battery. The battery controller measures battery voltage and charge in/out over multiple discharge/recharge cycles and uses this information to calibrate itself.

Data loggers will, however, typically use disposable batteries in order to get much higher energy densities and lower self-discharge rates (the tendency of batteries to spontaneously lose charge over time). While a battery monitoring chip (a "gas gauge" chip, e.g. Texas Instruments BQ27000) can accurately monitor the power supplied by a battery over its lifetime this is only useful if the initial amount of energy stored in the battery is known. The amount of energy a disposable battery can supply over its lifetime is highly dependent upon the current drain and so unless the system is supplied with only one type of battery, or the user is willing to transcribe battery drain graphs, the amount of energy a battery has already supplied is not a useful indicator of remaining life. The output voltage of lithium batteries, the predominant logger battery chemistry, is almost constant over the majority of its life and so this cannot be used as an indication of life remaining either (it will also vary with system temperature).

The battery modules 47 of the device of the present embodiment contain a small memory chip that, as well as supplying a unique ID for use in asset tracking, is able to be read and written by the microprocessor 30 of the device 10 during normal operation. The battery modules 47 are designed so that the user can replace the batteries themselves. After a battery replacement the user places the battery module 47 in communication with the central server 200 (via an "upload unit" or "deployment controller") which records the time and date of battery replacement in the battery memory chip and resets its count of the number of days that it has been operating to zero. Simultaneously the user tells the central server 200 the brand/model of battery that they have inserted into the module 47 and this information is associated with the ID number of the battery module until the time of the next battery change.

When the device 10 is started it will write the battery ID into its log file so that data that is uploaded has a battery ID associated with it. During operation the device 10 will update the battery module's run time counter one or more times a day (the number of times to do this is only limited by the write endurance of the memory module EEPROM chip, e.g. with 50 k cycles endurance the chip will last 11 years with a 2 hourly counter update). The energy consumption of a device 10 over a single day will generally be roughly constant and so basing battery lifetimes on a simple measure of runtime is valid.

The devices 10 have multiple safeguards so that they can shut down cleanly when a battery runs flat and will record the battery life in their data file when this happens. When the data is uploaded the central server 200 will therefore be able to build up a table of battery makes/models and known good lifetimes. This data can be made available to deployment controllers or simply presented to the user manually. When a user deploys a device 10 in the field, the logger can read the battery life counter from the battery module 47 and communicate this to the user's deployment controller which can present this information along with a predicted number of days life left.

As mentioned, the mechanical design of the battery enclosure 47 is to IP68. In addition, it provides over pressurization when closed in the range of 0.2-1 bar above atmospheric pressure. The battery enclosure includes an embedded digital air pressure sensor (Digital active pressure sensor. MS5534C Measurement Specialties). When the main module 46 unit powered by the battery is operational—the pressure is periodically measured in the battery enclosure 47 and if a change of 10% is detected, an alarm is triggered and communicated, optionally to the server 200. A process can also shut down the device 10 over a short period of time following the alarm. The user can set up this option for an extra protection against water ingress and additional safety. During the deployment setup, the pressure in the separate enclosures are measured and checked to certify a safe operation (the safety and equipment checks protocol). The information is displayed to the operator via the Deployment Controller and is also sent to the Central Server.

The invention claimed is:

1. A liquid-flow monitoring device configured to monitor the flow of liquid in a conduit, the device comprising a sampler, a processor, a memory, and a communication module, wherein:

the sampler is configured to receive data substantially continuously from a sensor indicative of at least one variable sensed by the sensor indicative of fluid flow in a conduit and to sample the data to produce a stream of sampled data;

the processor is configured to process the stream of sampled data to extract summary information and at least one sub-sampled stream therefrom, the sub-sampled stream comprising a plurality of data sets, each data set being a statistical subset of the stream of sampled data over a respective data-set period;

the memory is configured to store the at least one sub-sampled stream; and the communication module is configured to periodically transmit the summary information to a central location remote from the device and, upon receiving a request for a more complete representation of the stream of sampled data at or over a specified time, to transmit one or more data sets corresponding to the specified time to the central location.

2. A device according to claim 1, wherein the device is modular, components of the device being housed in respective housings that can be locally, and releasably, coupled together for operation.

3. A device according to claim 2, wherein the memory and the communication module are housed in a memory module that comprises a display readable by a user to indicate the operation of the device.

4. A device according to claim 2, wherein the memory is housed in a memory module and is configured for local communication with an interrogation apparatus and is configured to operate as a server during such communication.

5. A device according to claim 2, wherein one or more module is pressurised to contain air above atmospheric pressure such that the module floats in water and resists ingression.

6. A device according to claim 5, wherein the pressurised module comprises an air pressure sensor configured to provide data to the processor , wherein, upon detecting a drop in air pressure below a specified threshold, the processor is configured to identify that the module in question should be examined and generate a signal indicative of this.

7. A device according to claim 6, further comprising a battery module comprising an ID chip to uniquely identify a battery in the battery module, the ID chip being readable by the processor and when the battery module is connected for operation.

8. A device according to claim 1, wherein the summary information enables a processor at the central location to determine the approximate location of the cause of a transient event in the conduit.

9. A method of monitoring the flow of liquid in a conduit, the method comprising the steps of a liquid-flow monitoring device:

receiving data substantially continuously from a sensor, the data indicative of fluid flow in a conduit, and operating a sampler of the device to sample the data to produce a stream of sampled data;

processing, using a processor of the device, the stream of sampled data to extract summary information and at least one sub-sampled stream therefrom, the sub-sampled stream comprising a plurality of data sets, each data set being a statistical subset of the stream of sampled data over a respective data-set period;

storing, using memory of the device, the at least one sub-sampled stream;

periodically transmitting, using a communication module of the device, the summary information to a central location remote from the device; and upon receiving a request for a more complete representation of the stream of sampled data at or over a specified time, transmitting one or more data sets corresponding to the specified time to the central location.

10. A method according to claim 9, wherein the statistical subset comprised in each data set of the sub-sampled stream comprises the maximum and/or minimum and/or mean and/or standard deviation and/or another statistical value of the data over the respective period of the data set.

11. A method according to claim 9, wherein the at least one sub-sampled stream comprises a more complete representation of the stream of sampled data over a particular period than is provided by the extracted summary information over that period.

12. A method according to claim 9, wherein the statistical subset comprised in each data set of the sub-sampled stream comprises the maximum and/or minimum and/or mean and/or standard deviation and/or another statistical value of the data over the respective period of the data set.

13. A method according to claim 9, wherein the request is received from a central location remote from the device or from an interrogating apparatus coupled locally with the device.

14. A method according to claim 9, where there is a plurality of subsampled streams, each comprising a plurality of data sets that comprise a statistical subset of the stream of sampled data, the data sets of each subsampled stream comprising a statistical subset over periods of different respective length.

15. A method according to claim 14, wherein the request for a more complete representation is a request for a respective portion from each of a plurality of the sub-sampled streams, and wherein the communication module, in response to this request, transmits the one or more of the data sets in each of these portions.

16. A method according to claim 9, wherein the sub-sampled stream is stored in a circular buffer.

17. A method according to claim 9, wherein processing the stream of sampled data to extract summary information therefrom comprises processing the stream of sampled data to identify transient events and/or non-transient events by summing the difference between successive data points in the stream of sampled data over a time period to give a cumulative sum, and comparing the sum against a probability of that sum being indicative of a transient event to determine whether or not a transient event has been identified.

18. A method according to claim 17, wherein the processing the stream of sampled data to identify transient and/or non-transient events comprises processing the stream of sampled data over a rolling time period in the stream of sampled data.

19. A method according to claim 17, wherein the sum is compared against a record of the probability of that sum being indicative of a transient, the record being a probability distribution function of probability of the sum occurring against the value of the sum.

20. A method occurring to claim 19, comprising generating the record during operation of the device by recording each sum and its frequency of occurrence.

21. A method according to claim 17, wherein the record comprises an indication of a threshold indicative of the probability value below which it is determined that the sum is indicative of a transient event and hence that a transient event has been identified, the method comprising comparing, by referencing the record, the probability of the calculated cumulative sum occurring against that threshold.

22. A method according to claim 17, wherein, in response to identifying a transient event, the device operating a display of the device to indicate this.

23. A method according to claim 17, wherein, in response to identifying a transient event, the communications module transmits a signal indicative of this to the central location.

24. A method according to claim 9, wherein processing the stream of sampled data to extract the summary information therefrom may comprise determining summary statistical information from the stream of sampled data, the summary statistical information forming at least part of the extracted summary information; the summary statistical information comprising one or more maximum and/or minimum and/or mean and/or variance and/or standard deviation value of the portion of the stream.

25. A method according to claim 17, wherein, in response to identifying a transient event, the processor generates a transient descriptor that indicates one or more characteristics of the identified transient event, a transient descriptor indicating the gradient of the transient, the direction of the gradient, the start and/or stop magnitudes of the transient or the dissipation gradient.

26. A method according to claim 25, wherein the transient descriptor is used by the processor to generate an indication of the severity of the transient by comparing the value of the transient descriptor against an indication of the probability of that value of the transient descriptor occurring.

27. A method according to claim 26, wherein the value of the transient descriptor is compared with a probability distribution of measured values of the transient descriptor during use to ascertain the probability of that value.

28. A method according to claim 27, wherein the ascertained probability is compared with one or more thresholds to give the severity of the transient, and further comprising classifying the impact of the transient on the conduit as low impact, medium impact or high impact.

29. A method according to claim 26, wherein the ascertained severity of the transient is used to determine the frequency of transmission of the extracted summary information from the communication module.

30. A method according to claim 9, further comprising receiving respective data substantially continuously from each of a plurality of sensors indicative of a respective variable sensed by each sensor; sampling the data to produce a respective stream of sampled data for each of the variables sensed such that each stream is handled in parallel in substantially the same way.

31. A method according to claim 9, wherein the summary information includes information indicative of a transient event and a time stamp of the occurrence of that event.

* * * * *